US011812377B2

(12) United States Patent
Zhu et al.

(10) Patent No.: US 11,812,377 B2
(45) Date of Patent: *Nov. 7, 2023

(54) MOBILITY ENHANCEMENT WITH NETWORK SLICING

(71) Applicant: QUALCOMM INCORPORATED, San Diego, CA (US)

(72) Inventors: Xipeng Zhu, San Diego, CA (US); Gavin Bernard Horn, La Jolla, CA (US); Miguel Griot, La Jolla, CA (US); Ozcan Ozturk, San Diego, CA (US); Luis Fernando Brisson Lopes, Swindon (GB); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,536

(22) Filed: May 11, 2022

(65) Prior Publication Data

US 2022/0272624 A1 Aug. 25, 2022

Related U.S. Application Data

(62) Division of application No. 16/936,307, filed on Jul. 22, 2020, now Pat. No. 11,356,940.

(Continued)

(51) Int. Cl.
*H04W 48/18* (2009.01)
*H04W 76/25* (2018.01)
(Continued)

(52) U.S. Cl.
CPC .......... *H04W 48/18* (2013.01); *H04W 48/16* (2013.01); *H04W 60/00* (2013.01);
(Continued)

(58) Field of Classification Search
CPC ..... H04W 48/18; H04W 48/16; H04W 60/00; H04W 72/0453; H04W 76/15; H04W 76/25; H04W 76/27
See application file for complete search history.

(56) References Cited

U.S. PATENT DOCUMENTS 11,356,940 B2 * 6/2022 Zhu .................. H04W 72/0453
2020/0037387 A1 1/2020 Lee et al.
(Continued)

FOREIGN PATENT DOCUMENTS

WO 2018083664 A1 5/2018

OTHER PUBLICATIONS

"5G; System architecture for the 5G System (5GS) (3GPP TS 23.501 version 15.5.0 Release 15)", ETSI Technical Specification, European Telecommunications Standards Institute (ETSI), 650, Route Des Lucioles, F-06921, Sophia-Antipolis, France, vol. 3GPP SA, No. V15.5.0 Apr. 25, 2019 (Apr. 25, 2019), pp. 1-242, XP014344502, Retrieved from the Internet: URL: http://www.etsi.org/deliver/etsi_ts/123500_123599/123501/15.05.00_60/ts_123501v150500p.pdf—[retrieved on Apr. 25, 2019] p. 134, line 25-line 30.

(Continued)

Primary Examiner — Diane D Mizrahi
(74) Attorney, Agent, or Firm — Haynes and Boone, LLP

(57) ABSTRACT

Wireless communications systems and methods related to mobility with consideration for network slicing are provided. In one embodiment, a user equipment (UE) transmits in a first cell frequency of a network, a request for a network slice of the network that is not provided by the first cell frequency. The UE receives, in response to the request, an information for communicating in a second cell frequency of the network that provides the requested network slice. In one embodiment, a core network entity receives, from a network (Continued)

entity operating over a first cell frequency of a network, a request to provide a network slice of the network to a UE, the network slice not provided by the first cell frequency. The core network entity transmits, to the BS, information associated with a second cell frequency of the network providing the network slice.

29 Claims, 20 Drawing Sheets

Related U.S. Application Data

(60) Provisional application No. 62/880,531, filed on Jul. 30, 2019.

(51) Int. Cl.
*H04W 76/15* (2018.01)
*H04W 76/27* (2018.01)
*H04W 48/16* (2009.01)
*H04W 60/00* (2009.01)
*H04W 72/0453* (2023.01)

(52) U.S. Cl.
CPC ....... *H04W 72/0453* (2013.01); *H04W 76/15* (2018.02); *H04W 76/25* (2018.02); *H04W 76/27* (2018.02)

(56) References Cited

U.S. PATENT DOCUMENTS

2021/0037426 A1* 2/2021 Zhu .................. H04W 28/16
2021/0037455 A1   2/2021 Zhu

OTHER PUBLICATIONS

HUAWEI: "Allowed NSSAI", 3GPP Draft, 3GPP TSG RAN3 Meeting #99, R3-181098, Allowed NSSAI, 3rd Generation Partnership Project (3GPP), Mobile Competence Centre, 650, Route Des Lucioles, F-06921, Sophia-Antipolis Cedex, France, vol. RAN WG3, No. Athens, Greece; Feb. 26, 2018-Mar. 2, 2018, Feb. 16, 2018 (Feb. 16, 2018), XP051401423, 4 pages, Retrieved from the Internet: URL: http://www.3gpp.org/ftp/tsg%5Fran/WG3%5Fiu/TSGR3%5F99/Docs/ [retrieved on Feb. 16, 2018] p. 1, line 14-line 27.
International Search Report and Written Opinion—PCT/US2020/043325—ISA/EPO—dated Oct. 9, 2020.
Qualcomm Incorporated: "TS 23.502: Completion of Network Triggered Slice Change Text," 3GPP Draft, SA WG2 Meeting #124, S2-179430_WAS9350_8696_23 502 NW Triggered Slice Change, 3rd Generation Partnership Project (3GPP), Mobile Competence Centre, 650, Route Des Lucioles, F-06921 Sophia-Antipolis Cedex, F, vol. SA WG2, No, Reno, Nevada, USA, Nov. 27, 2017-Dec. 1, 2017, XP051365957, 10 Pages, Retrieved from the Internet: URL http://www.3gpp.org/ftp/Meetings%5F3GPP%5FSYNC/SA2/Docs/ [retrieved on Dec. 1, 2017] p. 4.

\* cited by examiner

MOBILITY ENHANCEMENT WITH NETWORK SLICING

CROSS REFERENCE TO RELATED APPLICATIONS

The present application is a divisional application of U.S. patent application Ser. No. 16/936,307, filed Jul. 22, 2020, which claims priority to and the benefit of U.S. Provisional Patent Application No. 62/880,531, filed Jul. 30, 2019, each of which is hereby incorporated by reference in its entirety as if fully set forth below and for all applicable purposes.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The improved latency, reliability, bandwidth, and/or throughput in NR enable various types of network deployments and/or services such as enhanced mobile broadband (eMBB), ultra-reliable, low-latency communication (URLLC), and/or Internet of Things (IoT) services. The different types of services may have different traffic requirements (e.g., latency, bandwidth, reliability, and/or throughput).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising transmitting, by a user equipment (UE) in a first cell frequency of a network, a request for a network slice of the network that is not provided by the first cell frequency; and receiving, by the UE in response to the request, information for communicating in a second cell frequency of the network that provides the network slice requested.

In an additional aspect of the disclosure, a method of wireless communication, comprising obtaining, by a base station (BS), an indication that a user equipment (UE) is interested in a network slice of a network not provided by a first cell frequency, the BS in communication with the UE in the first cell frequency; and receiving, by the BS from a core network entity, information associated with a second cell frequency of the network providing the network slice.

In an additional aspect of the disclosure, a user equipment (UE) comprising a transceiver configured to transmit, in a first cell frequency of a network, a request for a network slice of the network that is not provided by the first cell frequency; and receive, in response to the request, an information for communicating in a second cell frequency of the network that provides the network slice requested.

In an additional aspect of the disclosure, a base station (BS) comprising a processor configured to obtain an indication that a user equipment (UE) is interested in a network slice of a network not provided by a first cell frequency, the BS in communication with the UE in the first cell frequency; and a transceiver configured to receiving, by the BS from a core network entity, information associated with a second cell frequency of the network providing the network slice.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
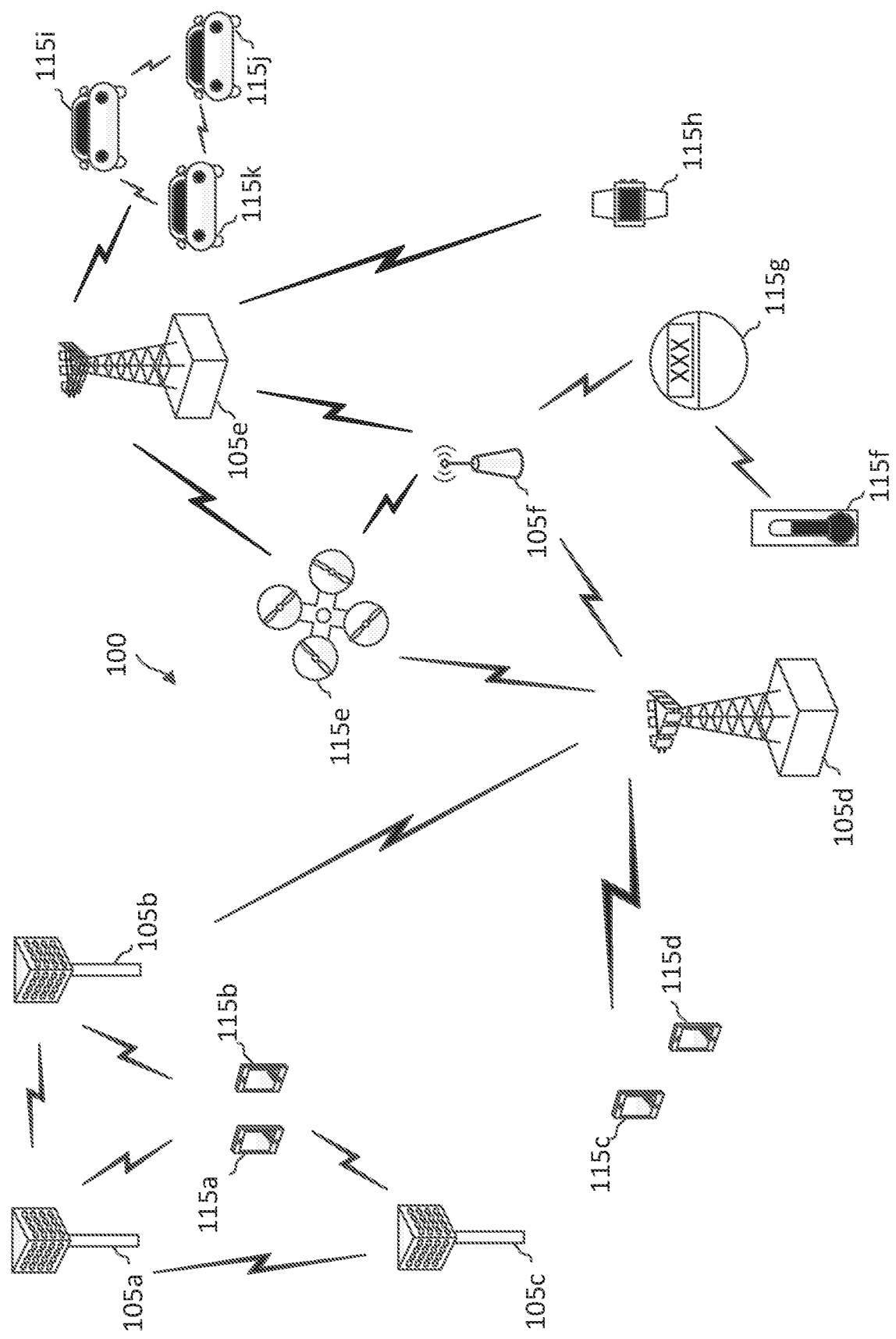
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-PUMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR may employ network slicing to configure multiple network slices to support traffic with different traffic requirements. A network slice generally refers to a logical network that comprises a set of network functions and corresponding resources necessary to provide certain network capabilities and network characteristics. A network slice may include functions of an access network (AN) and a core network (CN). A network slice instance (NSI) is an instantiation of a network slice, i.e. a deployed set of network functions delivering the intended network slice services according to a network slice template.

In an example, a network slice comprises control plane and user plane functionality and resources required to fulfill a particular service or set of services and may include: 1) core network control plane and user plane network functions, as well as their resources (in terms of compute, storage and network resources, including transport resources between the network functions); 2) a radio access network; and 3) in the case of a network slice supporting a roaming service, a visitor public land mobile network (VPLMN) part and a home PLMN (HPLMN) part.

In some examples, a UE may simultaneously require multiple services of different traffic requirements. For example, the UE may require an enhanced mobile broadband (eMBB) service with a high throughput and an ultra-reliable, low-latency communication (URLLC) service. However, with network slicing, operators may typically deploy one or more network slice with a high throughput over a certain frequency carrier (e.g., F1) for serving eMBB services and one or more network slice with a low-latency over another frequency carrier (e.g., F2) for serving URLLC services. In other words, if a UE is on the frequency carrier F1, the UE may have access to eMBB slices, but no access to URLLC slices. Similarly, if a UE is on the frequency carrier F2, the UE may have access to URLLC slices, but no access to eMBB slices.

The present application describes mechanisms for performing mobility with network slicing into consideration. For example, a UE is associated with a first cell frequency of a network or a BS operating over the first cell frequency. The association can be based on a cell selection, a camping procedure, a random access procedure, a connection set up procedure, and/or a network registration. The UE may be interested in a particular network slice of the network that is not allowed, available, or supported by the first cell frequency. The particular network slice may not be within allowed network slice selection assistance information (NSSAI) of the first cell frequency. The particular network slice may be served over a second cell frequency of the network. The UE may request the network for the interested network slice over the first cell frequency via non-access stratum (NAS) signaling, radio resource control (RRC) signaling, and/or on-demand system information block (SIB) requests. The network can instruct the UE to perform a handover to the second cell frequency, a dual-connectivity with the second cell frequency, or a carrier aggregation with the second cell frequency. The UE may perform the handover, the dual-connectivity, or the carrier aggregation accordingly. Subsequently, the UE may receive a service over the particular network slice in the second cell frequency. In an embodiment, the BS may be in communication with a core network that manages the network slices in the network. The core network may provide the BS with information associated with the UE's interested network slice and/or information associated with the second cell frequency that provides the UE's interested slice.

Aspects of the present disclosure can provide several benefits. For example, the enabling of the UE to request for the particular network slice not included in the allowed NSSAI allows the UE to dynamically request for the network slice based on service initiation and/or application initiation at the UE. The on-demand SIB request for network slice information enables the UE to perform network slice-based cell selection and/or network slice-aware cell reselection. The provisioning of information associated with the UE's interested network slice to the BS enables the BS to perform network slice-based handover.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (PD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115. A registration area may have one or more tracking areas. A tracking area may have one or more cells. Additionally, a tracking area identity (TAI) is an identifier that is used to track tracking areas. The TAI may be constructed from the PLMN identity to which the tracking area belongs and the tracking area code (TAC) of the tracking area.

In an embodiment, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the component carrier to a UE 115 for UL and DL communications. For example, the BWP pair may include one BWP for UL communications and one BWP for DL communications.

In an embodiment, the network 100 may be a 5G network. The network 100 may implement network slicing to create multiple isolated virtual networks or independent logical network slices to support a variety of application services in the network 100. The network 100 may configure each network slice according to the specific needs of the services being served. In an embodiment, the network 100 may configure a network slice with a high throughput for serving eMBB services and configure another network slice with a low latency and high reliability for serving URLLC services. A UE 115 may request for a particular network slice (e.g., an eMBB slice or an URLLC slice) during various network procedures and the network 100 and/or the UE 115 may take network slicing in consideration during the network procedures. Some examples of network procedures that may take network slicing into consideration may include cell selection, cell reselection, network registrations, network service establishments, PDU session establishments, and/or mobility. Mechanisms for provisioning for network slicing are described in greater detail herein.

Figure 2:
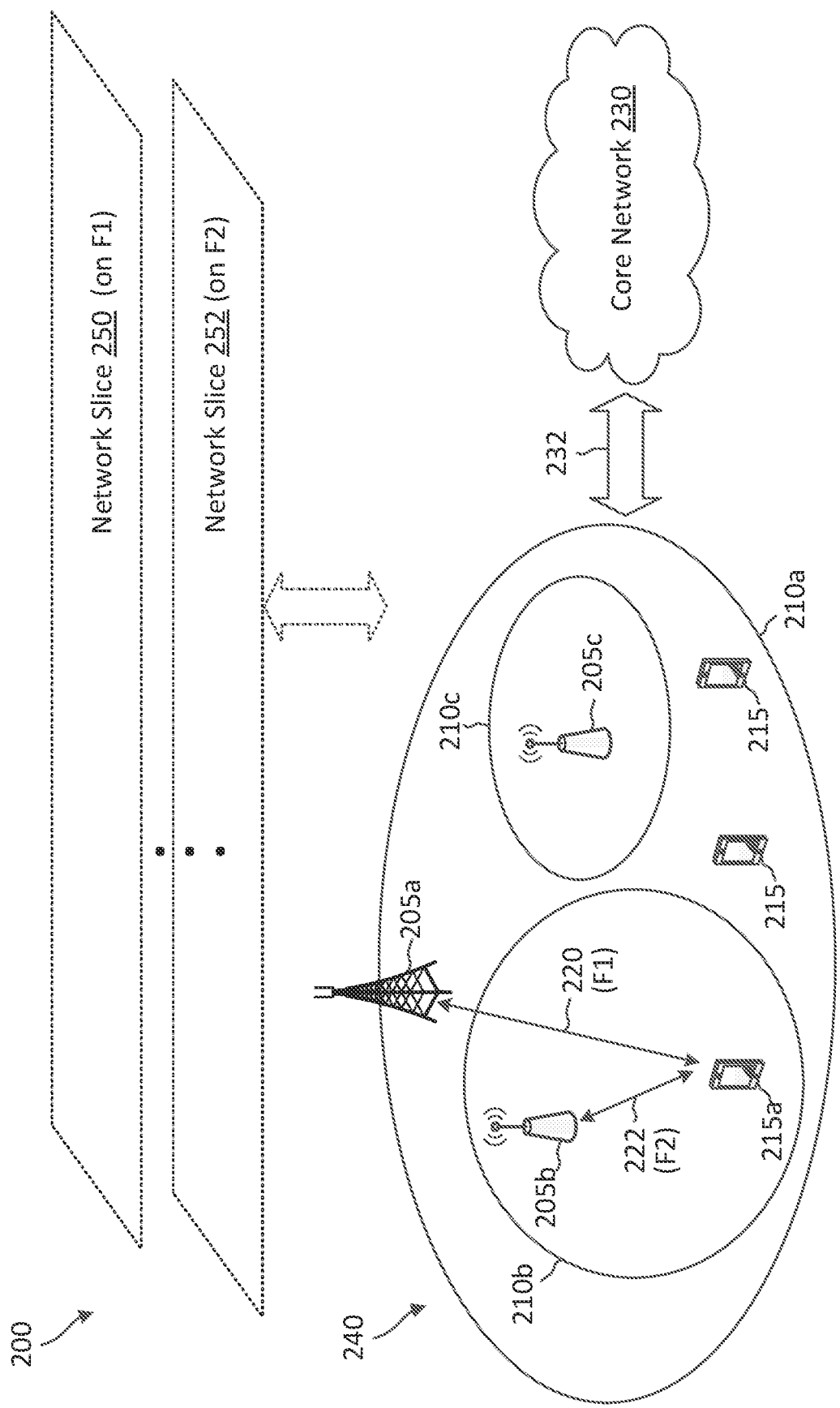
FIG. 2 illustrates a wireless communication network system that implements network slicing according to some embodiments of the present disclosure.

FIG. 2 illustrates a wireless communication network 200 that implements network slicing according to some embodiments of the present disclosure. The network 200 may correspond to a portion of the network 100. The network 200 may be a 5G network. The network 200 includes a radio access network (RAN) 240 in communication with a core network 230 via backhaul links 232. For simplicity of illustration and discussions, FIG. 2 illustrates three BSs 205*a*, 205*b*, and 205*c* and three UEs 215 in the RAN 240. However, the RAN 240 may be scaled to include any suitable number of BSs (e.g., about 2, 4, 5, or more) and/or any suitable number of UEs (e.g., up to millions). The BSs 205 are similar to the BSs 105. The UEs 115 are similar to the UEs 115.

In the network 200, the BS 205*a* may serve UEs 215 over a frequency carrier 220 in an area 210*a*, the BS 205*b* may serve UEs 215 over another frequency carrier 222 in an area 210*b*, and the BS 205*c* may serve UEs 215 over the frequency carrier 222 in an area 210*c*. The frequency carrier 220 and the frequency carrier 222 may be at any suitable frequency. In some examples, the frequency carrier 220 and the frequency carrier 222 can be at sub-6 gigahertz (GHz) bands. In some examples, the frequency carrier 220 and the frequency carrier 222 can be at mmWav bands. In some examples, one of the frequency carriers 220 and 222 can be at a sub-6 GHz band and the other frequency carriers 220 and 222 can be at a mmWav band.

In an example, the UEs 215 may be a smart phone requiring eMBB services and may additionally require URLLC services. In an example, the UE 215*a* may include an extended reality (XR) application and may require an URLLC service for communicating XR application data. In an example, the UE 215*a* may be a remote diagnostic device with sensors that requires an URLLC service for communicating health monitoring information. In an example, the UE 215*a* may be associated with an intelligent transportation system that requires an URLLC service for communicating transport information. In some examples, the UE 215*a* may require an eMBB service and URLLC services at the same time.

In an example, the core network 230 is a 5G core network and may provide network functions such as an authentication server function (AUSF), an AMF, a session management function (SMF), a policy control function (PCF), a user plane function (UPF), an application functions (AFs), a unified data repository (UDR), an unstructured data storage network function (UDSF), a network exposure function (NEF), an NF repository function (NRF), a unified data management function (UDM), and/or a network slice selection function (NSSF). The BSs 205 may coordinate with the core network 230 in serving the UEs 215.

In an example, the network 200 may implement network slicing to provision for the eMBB services and the URLLC services. For example, the network 200 may configure one or more network slices 250 over the frequency carrier 220 and one or more network slices 252 over the frequency carrier 222. Each of the network slices 250 and 252 may function as a logical network and may implement AN and CN functionalities as described above. In an example, all the network slices 250 may serve one type of services (e.g., eMBB services or URLLC services). In an example, at least one network slice 250 may serve a different type of services than the other network slices 250. Similarly, in an example, all the network slices 252 may serve one type of services (e.g., eMBB services or URLLC services). In an example, at least one network slice 252 may serve a different type of services than the other network slices 252.

In an example, the network slices 250 over the frequency carrier F1 220 may serve one or more types of services and the network slices 252 over the frequency carrier F2 220 may serve one or more types of services, but at least one type of service is served over by one of the network slices 250 and one of the network slices 252. For example, all network slices 250 may serve MBB services, at least one network slice 252 may serve URLLC services, and at least one network slice 252 may serve eMBB services. Alternatively, at least one network slice 250 may serve MBB services, at least one network slice 250 may serve voice services, at least one network slice 252 may serve URLLC services, and at least one network slice 252 may serve eMBB services.

In some examples, the frequency carrier 220 may be at about 2.6 GHz and may be shared with a LTE TDD network, whereas the frequency carrier 222 may be at about 4.9 GHz which may not be shared with a LTE TDD network. Due to the sharing with the LTE TDD network on the 2.6 GHz carrier, communications over the 2.6 GHz carrier may have various restrictions. For example, UL-to-DL and/or DL-to-UL switching time for communication over the 2.6 GHz carrier is required to align to the UL-to-DL and/or DL-to-UL switching time of the LTE TDD network. Thus, some operators may deploy eMBB slices, but not URLLC slices over the 2.6 GHz carrier. Instead, the operators may deploy URLLC slices over the less restrictive 4.9 GHz carrier.

In some instances, while the UE 215*a* is served by the BS 205*a* over the frequency carrier 220 for an eMBB service in a network slice 250, the UE 215*a* may launch an application requiring an URLLC service. Thus, the network 200 is required to direct the UE 215*a* to the frequency carrier 222 so that the UE 215*a* may receive the URLLC service in a network slice 252. However, the selection and/or configuration of network slices are typically performed by the core network 230 as descried in greater detail herein. The UE 215*a* may not have knowledge about which frequency carrier or cell in the network 200 may provide a network slice that can support an URLLC service. A BS 205 may be aware of the active network slice used by a UE 215, but may not be aware of which network slice is available or allowed in which frequency carrier over the network 200. While the network 200 may support eMBB services and URLLC services on the same network slice (e.g., in a network slice 252 over the frequency carrier 222) to avoid such issues, the network 200 may not benefit from network slicing, and thus may not be desirable.

Figure 3:
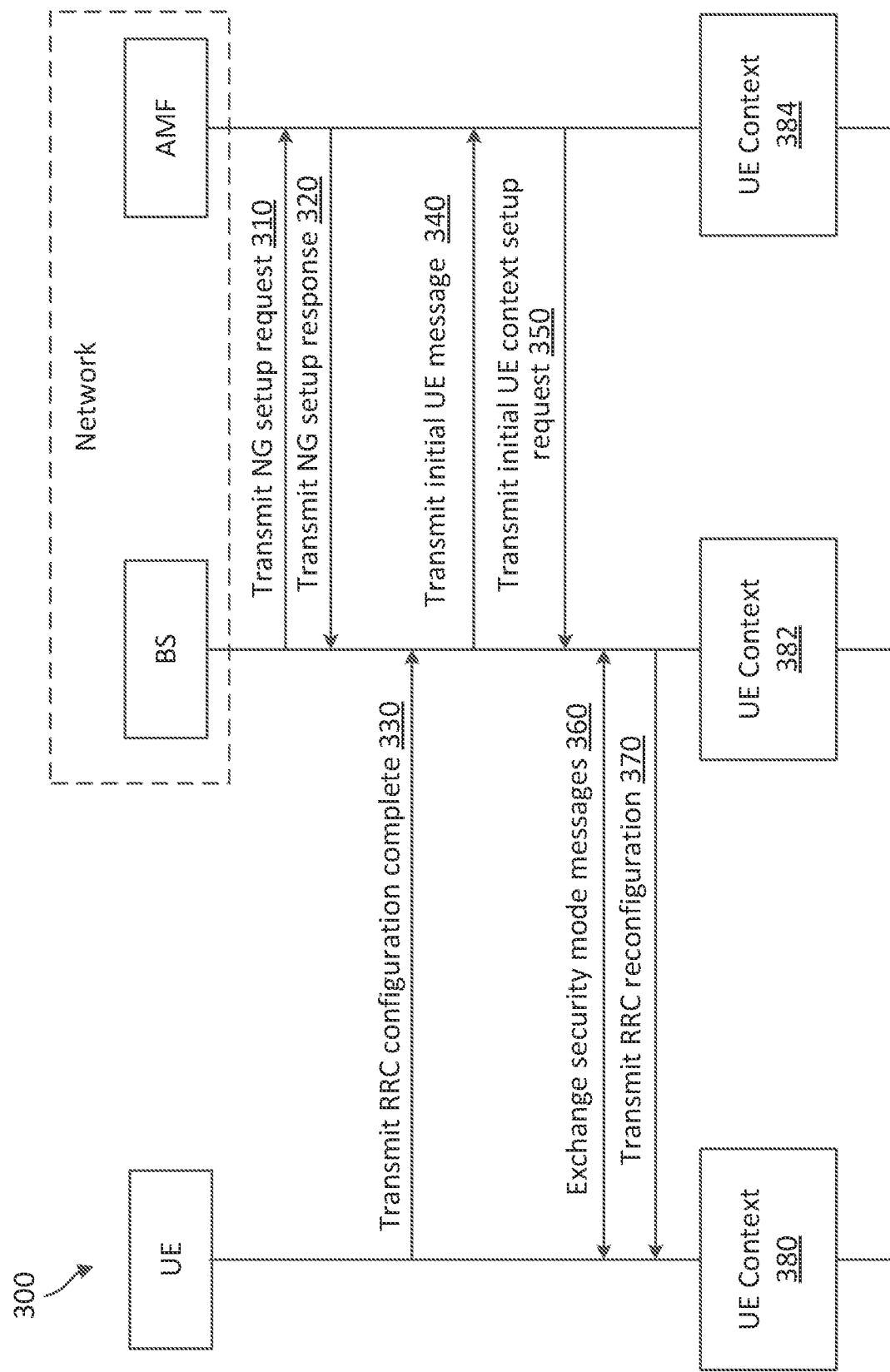
FIG. 3 is a signaling diagram illustrating a network registration method according to some embodiments of the present disclosure.

FIG. 3 is a signaling diagram illustrating a network slicing provisioning method 300 according to some embodiments of the present disclosure. The method 300 may be implemented by a UE similar to the UEs 115 and 215, a BS similar to the BSs 105 and 205, and an AMF (e.g., a component of a core network such as the core network 230). The BS and the AMF may generally be referred to as the network side. Steps of the method 300 can be executed by computing devices (e.g., a processor, processing circuit, and/or other suitable component) of the BS, the UE, and an AMF component. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 310, the BS transmits a next generation (NG) setup request message to the AMF. The NG setup request message indicates one or more network slices (e.g., the network slices 250) supported by the BS. In an example, the NG setup request message may include a single-network slice selection assistance information (S-NSSAI) list per tracking area.

At step 320, in response to the NG setup request message, the AMF transmits a NG setup response message to the BS. Based on the NG setup request message, the AMF may have knowledge of the network slices supported by the BS and/or the tracking area of the BS. The AMF may perform similar NG setup request and response message exchange with other BSs, and thus the AMF may have knowledge of network slices supported by the other BSs and/or other tracking areas.

At step 330, the UE transmits an RRC connection setup completion message to the BS. For example, the UE may have completed a successful random access procedure with the BS. The random access procedure may include the exchange of MSG 1, MSG 2, MSG 3, and MSG 4 described above with respect to FIG. 1. In some instances, the RRC connection setup completion message is exchanged after MSG 4, and may be referred to as a message 5 (MSG 5).

In an example, the RRC connection setup completion message may include a NAS registration request. The NAS registration request may include requested-NSSAI. The requested-NSSAI may indicate one or more network slices (e.g., the network slices 250) requested by the UE, for example, based on applications that may be used by the UE or potentially used by the UE.

At step 340, upon receiving the RRC connection setup completion message indicating NAS registration message, the BS transmits an initial UE message to the AMF. The initial UE message may include the NAS registration request.

At step 350, in response to the initial UE message, the AMF transmits an initial UE context setup request message to the BS. The initial UE context setup request message may include allowed NSSAI. The allowed NSSAI may indicate requested network slices that are allowed in the tracking area. The allowed NSSAI may be a minimal common set of requested-NSSAI, subscribed NSSAI (e.g., based on the UE's subscription), and NSSAI supported by a current tracking area. The initial UE context setup request message may include a NAS registration accept message including the allowed NSSAI. In an example, the UE may include a slice A (e.g., the network slice 250) and a slice B (e.g., the network slice 252) in the requested-NSSAI at the step 330. The AMF may allow slice A, but may reject slice B. In such an example, the AMF may include allowed NSSAI and rejected NSSAI in the initial UE context setup request message. The allowed NSSAI may indicate the slice A and the rejected NSSAI may indicate the slice B.

At step 360, after receiving the initial UE context setup request message from the AMF, the BS and the UE perform a security mode control procedure to exchange various security mode messages.

At step 370, after completing the security mode control procedure, the BS transmits an RRC reconfiguration message to the UE. The RRC reconfiguration message may include a NAS registration accept message indicating allowed NSSAI. At this time, the UE may have a UE context 380 including configured NSSAI (e.g., based on a pre-configuration on the UE), the requested NSSAI, the allowed NSSAI, and/or the rejected NSSAI. The BS may have a UE context 382 including the allowed NSSAI and NSSAI of active PDU sessions of the UE. The AMF may include a UE context 384 including subscribed NSSAI, the requested NSSAI, the allowed NSSAI, and the rejected NSSAI.

As can be observed from the method 300, the BS may not have knowledge of what network slices are supported in the network. While the BS may receive rejected NSSAI in the initial UE context setup response message from the AMF in the step 350, the BS may not have knowledge of whether the network slices indicated in the rejected NSSAI is supported over a different cell frequency and/or a different tracking area or not being support by the network. Thus, the BS (or a RAN) may not have sufficient information to consider network slices that are interested or required by the UE when performing mobility of the UE. Similarly, when the UE requested a network slice that is not in the allowed NSSAI, the UE is not provided with further information associated with requested network slice. Additionally, the UE may not have knowledge of whether the UE can request a certain network slice (e.g., an URLLC slice) from the network on-demand.

Further, current network slicing technology may have various restrictions. For example, slice support is uniform in a tracking area. Frequency carriers with different slice support are typically configured in different tracking areas. All slices in allowed NSSAI are support by a tracking area. The UE may not be allowed to request a slice that is indicated in the rejected NSSAI except when there is a tracking area change. The UE may only request a PDU session establishment over a slice within the allowed NSSAI. The restrictions on the current network slicing technology and the lack of slice-to-frequency mapping information available at the BS and/or the UE may cause challenges in supporting UEs that require multiple network slices provided by different frequency carriers.

Accordingly, the present disclosure provides various signaling techniques for a UE (e.g., the UEs 115) to request a network slice that is not supported by a cell frequency where the UE is currently camped on or by a current registered tracking area of the UE. The present disclosure also provides techniques for BSs (e.g., the BSs 105 and 205) and/or a RAN (e.g., the RAN 240) to take network slices that are interested by a UE into consideration when performing mobility for the UE.

Figure 4:
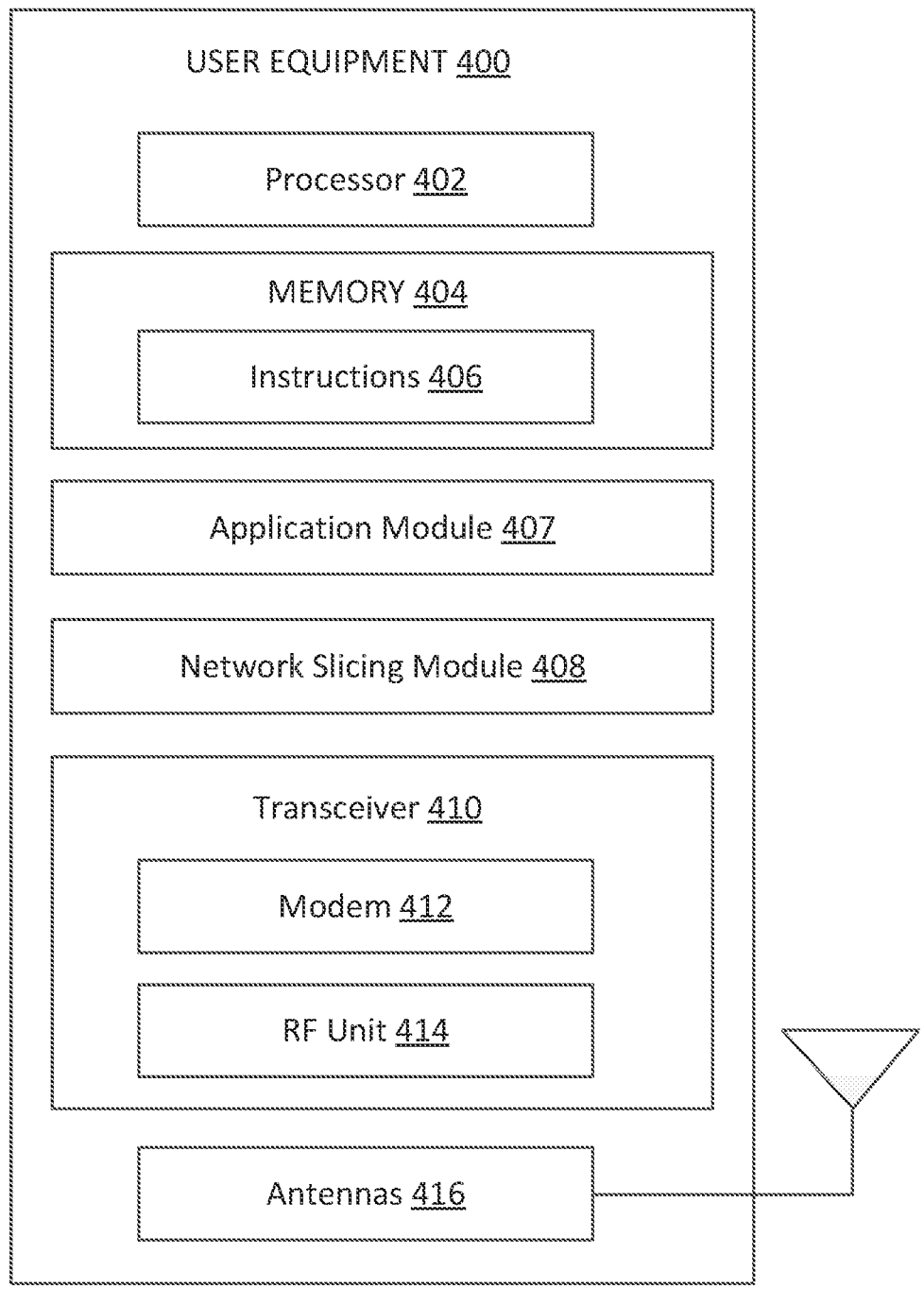
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 or a UE 215 discussed above in FIGS. 1 and 2, respectively. As shown, the UE 400 may include a processor 402, a memory 404, an application module 407, a network slicing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 7-15. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the application module 407 and the network slicing module 408 may be implemented via hardware, software, or combinations thereof. For example, each of the application module 407 and the network slicing module 408 may be implemented as a processor, circuit, and/or instructions 406 stored in the memory 404 and executed by the processor 402. In some examples, the application module 407 and the network slicing module 408 can be integrated within the modem subsystem 412. For example, the application module 407 and the network slicing module 408 can be implemented by a combination of software components (e.g., executed by a DSP or a general processor) and hardware components (e.g., logic gates and circuitry) within the modem subsystem 412. In some examples, a UE may include one or both of the application module 407 and the network slicing module 408. In other examples, a UE may include all of the application module 407 and the network slicing module 408.

The application module 407 and the network slicing module 408 may be used for various aspects of the present disclosure, for example, aspects of FIGS. 7-15. The application module 407 is configured to implement two or more applications. The applications may have different service requirements (e.g., latency and/or bandwidth). The applications may include at least an eMBB application (e.g., streaming and/or file transfer) and a URLLC application (e.g., XR, remote healthcare related, or intelligent transport related). The application module 407 is configured to transmit a request to setup a PDU session for an eMBB service or a URLLC service to the network slicing module 408.

The network slicing module 408 is configured to perform an association with a BS (e.g., the BSs 105 and/or 205) operating over a first cell frequency (e.g., the frequency carrier 220) of a network (e.g., the networks 100 and/or 200) and transmit, in the first cell frequency, a request for a particular network slice (e.g., the network slices 250 and 252) of the network that is not supported in the first cell frequency. The association can be based on a cell selection, a camping procedure, a random access procedure, a connection set up procedure, and/or a network registration. The request can be transmitted in a NAS registration request message, a NAS service request message, a NAS PDU session request message, an RRC service indication message, or an on-demand SIB request message. The NAS registration request message can include one or more requested network slices and priorities of the requested network slices.

In an embodiment, the network slicing module 408 is configured to receive, from the BS, an instruction to perform a handover to a second cell frequency that supports the requested network slice, perform a dual-connectivity with the second cell frequency, or perform a carrier aggregation with the second cell frequency to access the requested slice in the second cell frequency. The network slicing module 408 is configured to perform the handover, the dual-connectivity, or the carrier aggregation based on the instruction received from the BS, perform a network registration requesting for the particular network slice after the handover, the dual-connectivity, or the carrier aggregation, establish a PDU session over the network slice, and/or communicate data in the PDU session over the network slice.

In an embodiment, the network slicing module 408 is configured to determine that an interested network slice is not available or allowed over a current cell frequency, transmit an on-demand SIB request to request for frequency to network slice mapping information for the interested network slice, receive frequency to network slice mapping information for the network slice, and perform a network slice-aware cell selection and/or reselection. Mechanisms for performing mobility with network slicing consideration are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the network slicing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., NAS messages, RRC messages) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., NAS messages and RRC messages) to the network slicing module 408 for processing. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
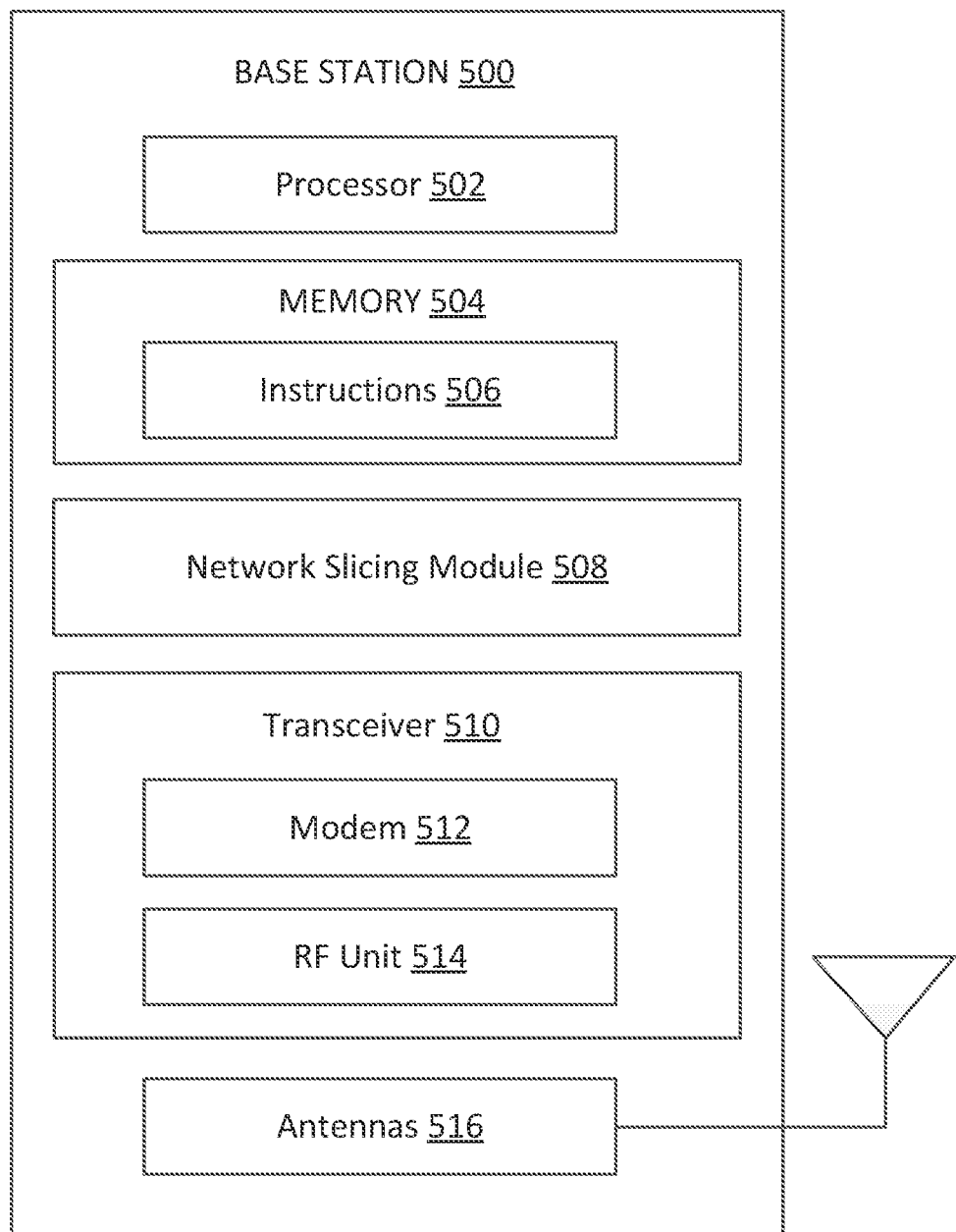
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 or BS 205 as discussed above in FIGS. 1 and 3, respectively. As shown, the BS 500 may include a processor 502, a memory 504, a network slicing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 7-15. Instructions 506 may also be referred to as code, which may be interpreted broadly to include any type of computer-readable statement(s) as discussed above with respect to FIG. 4.

The network slicing module 508 may be implemented via hardware, software, or combinations thereof. For example, the network slicing module 508 may be implemented as a processor, circuit, and/or instructions 506 stored in the memory 504 and executed by the processor 502. In some examples, the network slicing module 508 can be integrated within the modem subsystem 512. For example, the network slicing module 508 can be implemented by a combination of software components (e.g., executed by a DSP or a general processor) and hardware components (e.g., logic gates and circuitry) within the modem subsystem 512.

The network slicing module 508 may be used for various aspects of the present disclosure, for example, aspects of FIGS. 7-15. The network slicing module 508 is configured to serve UEs (e.g., the UEs 115, 215, and/or 400) over a first cell frequency (e.g., the frequency carrier 220), perform an association with a UE, and transmit, from the UE in the first cell frequency, a request for a particular network slice (e.g., the network slices 250 and 252) of the network that is not supported in the first cell frequency. The association can be based on a cell selection, a camping procedure, a random access procedure, a connection set up procedure, and/or a network registration. The request can be transmitted in a NAS registration request message, a NAS service request message, a NAS PDU session request message, an RRC service indication message, or an on-demand SIB request message. The NAS registration request message can include one or more requested network slices and priorities of the requested network slices.

In an embodiment, the network slicing module 508 is configured to relay, to a core network entity (e.g., the core network 230), NAS messages received from the UE and relay, to the UE, NAS messages received from the core network entity. In an embodiment, the network slicing module 508 is configured to relay, to the core network entity, a NAS registration request message from the UE requesting one or more network slices and receive, from the core network entity, an initial UE context setup requesting message indicating priorities of network slices that are of interest to the UE. In an embodiment, the network slicing module 508 is configured to relay, to the core network entity, a NAS service request message from the UE requesting a network slice, and receive, from the core network entity, an initial UE context setup requesting message instructing the BS 500 to direct the UE to the second cell frequency that includes the UE's requested network slice. In an embodiment, the network slicing module 508 is configured to receive information associated with the UE's interested network slice and select a target cell for a handover of the UE based on the UE's interested network slice.

In an embodiment, the network slicing module 508 is configured to transmit, to the UE, an instruction to perform a handover to a second cell frequency that supports the requested network slice and perform a dual-connectivity with the second cell frequency, or perform a carrier aggregation with the second cell frequency to access the requested slice in the second cell frequency according to the instruction.

In an embodiment, the network slicing module 508 is configured to receive, from the UE, an on-demand SIB request to request for frequency to network slice mapping information for the interested network slice and transmit slice-to-frequency mapping information for the network slice based on upon the request from the UE. Mechanisms for performing mobility with network slicing consideration are described in greater detail herein.

As shown, the transceiver 510 may include the modem subsystem 512 and the RF unit 514. The transceiver 510 can be configured to communicate bi-directionally with other devices, such as the UEs 115, 215, and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., NAS messages and/or RRC messages) from the modem subsystem 512 (on outbound transmissions) or of transmissions originating from another source such as a UE 115, 215, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, 215, or 400 according to embodiments of the present disclosure. The antennas 516 may further receive data messages transmitted from other devices and provide the received data messages for processing and/or demodulation at the transceiver 510. The transceiver 510 may provide the demodulated and decoded data (e.g., NAS messages and/or RRC messages) to the network slicing 508 for processing. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
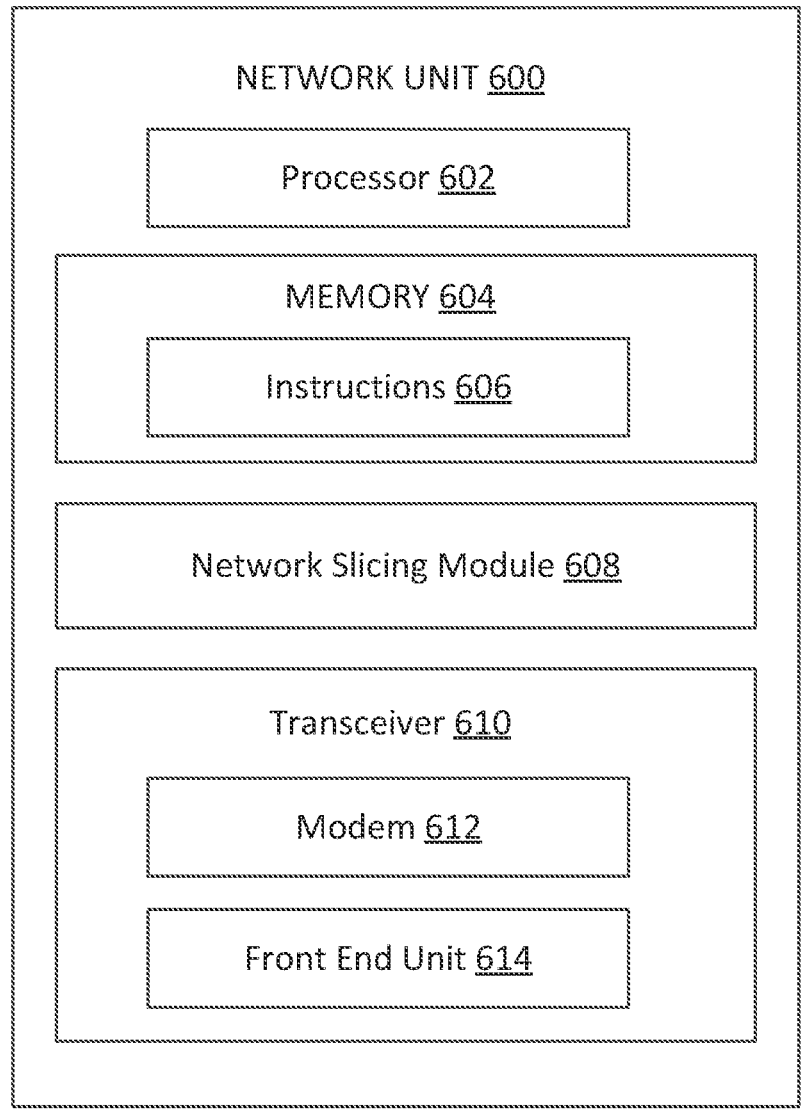
FIG. 6 is a block diagram of an exemplary network unit according to some embodiments of the present disclosure.

FIG. 6 illustrates a block diagram of an exemplary network unit 600 according to embodiments of the present disclosure. The network unit 600 may be a core network component of a core network such as the core network 230 discussed above in FIG. 2. A shown, the network unit 600 may include a processor 602, a memory 604, a network slicing module 608, and a transceiver 610 including a modem subsystem 612 and a frontend unit 614. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 4.

The network slicing module 608 may be implemented via hardware, software, or combinations thereof. For example, the network slicing module 608 may be implemented as a processor, circuit, and/or instructions 606 stored in the memory 604 and executed by the processor 602. The network slicing module 608 may be used for various aspects of the present disclosure, for example, aspects of FIGS. 7-15. For example, the network slicing module 608 is configured to receive, from a UE (e.g., the UEs 115, 215, and/or 400) via a BS (e.g., the BSs 105, 205, and/or 500, a NAS registration message requesting a network slice (e.g., the network slices 250 and 252) not supported by a cell frequency (e.g., the frequency carriers 220 and 222) that the UE is currently camped on or associated with, transmit, to the BS, an initial UE context setup request message based on the NAS registration message. The NAS registration message may indicate one or more network slices requested by the UE and priorities of the requested network slices. The initial UE context setup request message can include the priorities of the UE's interested network slices. In an embodiment, the network slicing module 608 is configured to receive, from the UE via the BS, a NAS service request message requesting a network slice not supported by a cell frequency that the UE is currently camped on or associated with and transmit, to the BS, an initial UE context setup request message requesting the BS to switch the UE to a cell frequency that provides the UE's requested network slice. In an embodiment, the network slicing module 608 is configured to receive, from the UE via the BS, a PDU session request message requesting a PDU session over a network slice not supported by a cell frequency that the UE is currently camped on or associated with and transmit, to the BS, a PDU session resource setup message to the BS. Mechanisms for facilitating network slice-aware mobility are described in greater detail herein.

As shown, the transceiver 610 may include the modem subsystem 612 and the frontend unit 614. The transceiver 610 can be configured to communicate bi-directionally with other devices, such as the BSs 105, 205, and 600 and/or another core network element. The modem subsystem 612 may be configured to modulate and/or encode data according to a MCS, e.g., a LDPC coding scheme, a turbo coding scheme, a convolutional coding scheme, etc. The frontend unit 614 may include electrical-to-optical (E/O) components and/or optical-to-electrical (O/E) components that convert an electrical signal to an optical signal for transmission to a BS such as the BSs 105, 210, and 220 and/or receive an optical signal from the BS and convert the optical signal into an electrical signal, respectively. The frontend unit 614 may be configured to process (e.g., perform analog to digital conversion or digital to analog conversion, optical to electrical conversion or electrical to optical conversion, etc.)

modulated/encoded data from the modem subsystem 612 (on outbound transmissions) or of transmissions originating from another source such as a backend or core network. Although shown as integrated together in transceiver 610, the modem subsystem 612 and the frontend unit 614 may be separate devices that are coupled together at the network unit 600 to enable the network unit 600 to communicate with other devices. The frontend unit 614 may transmit optical signal carrying the modulated and/or processed data over an optical link such as the links 232. The frontend unit 614 may further receive optical signals carrying data messages and provide the received data messages for processing and/or demodulation at the transceiver 610.

FIGS. 7, 8, 9A, and 9B illustrate various mechanisms to a UE (e.g., the UEs 115, 215, and/or 400) with NAS signaling for indicating network slice priorities and/or requesting a network slice that is not in allowed NSSAI. In other words, the requested network slice is not supported by a cell frequency (e.g., the frequency carriers 220 and/or 222) camped on by the UE or in a registered tracking area of the UE.

Figure 7:
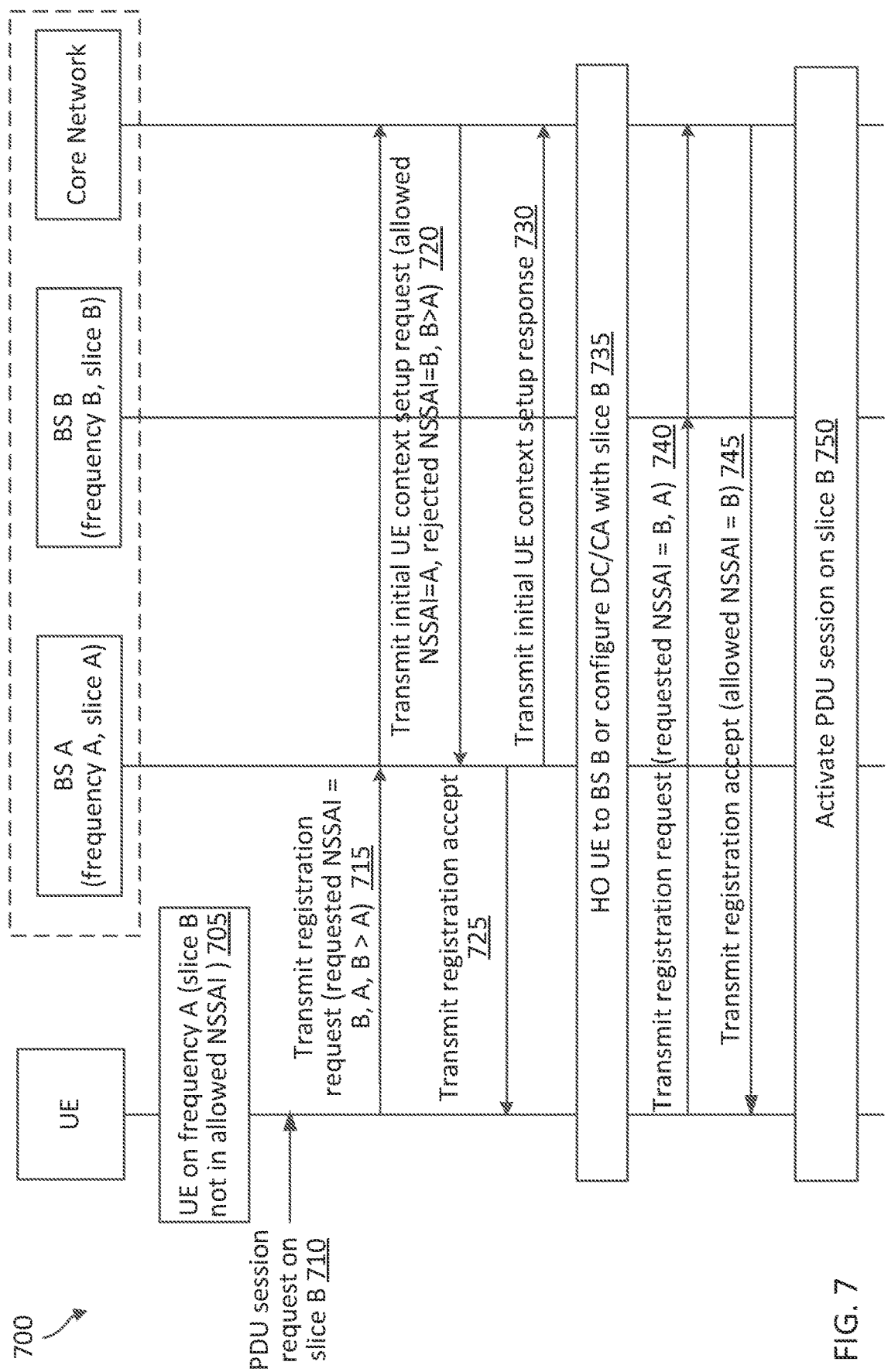
FIG. 7 is a signaling diagram illustrating a network slicing provisioning method according to some embodiments of the present disclosure.

FIG. 7 is a signaling diagram illustrating a network slicing provisioning method 700 according to some embodiments of the present disclosure. The method 700 may be implemented by a UE, a BS A, a BS B, and a core network. The UE may be similar to the UEs 115, 215, and/or 400. The BS A and the BS B may be similar to the BSs 105, 205, and/or 500. The BS A may operate over a frequency A (e.g., the frequency carrier 220) supporting a network slice A (e.g., an eMBB slice similar to the slice 250). The BS B may operate over a frequency B (e.g., the frequency carrier 222) supporting a network slice B (e.g., an URLLC slice similar to the slice 252). The core network may be similar to the core network 230 and may include one or more network components to the network unit 600. In an example, the core network may include an AMF component (e.g., the network unit 600) that implements the method 700. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 705, the UE is associated with frequency A, where slice B is not included in allowed NSSAI for frequency A. The UE may have performed a random access procedure over the frequency A with the BS A.

At step 710, the UE receives a PDU session request on the slice B, for example, initiated by an application requiring a service (e.g., an URLLC service) on the slice B or by a higher layer operating system (OS) of the UE.

At step 715, the UE transmits a NAS registration request message to the core network via the BS A. The registration request message may include requested-NSSAI indicating the slice A and the slice B. The registration request message may include a priority between the slice A and the slice B. For example, the registration message may indicate that the slice B has a higher priority than slice A (denoted as B>A). In other words, the UE is more interested in receiving services from the slice B than from the slice A.

At step 720, the core network transmits an initial UE context setup request message to the BS A. For example, an AMF of the core network may reject slice B, which is not supported over the frequency A. The initial UE context setup request message may include allowed NSSAI indicating the slice A and rejected NSSAI indicating the slice B. The initial UE context setup request message may indicate to the BS A that slice B has a higher priority than slice A. The core network or the AMF may have knowledge that the slice B is supported over the frequency B or the BS B. The initial UE context setup request message may provide instructions for the BS A to direct the UE to the frequency B that provides the slice B.

At step 725, upon receiving the initial UE context setup request message from the core network, the BS A transmits a NAS registration accept message to the UE. At step 730, the BS A transmits an initial UE context setup response message to the core network accepting the initial UE context setup request.

At step 735, the BS A may instruct the UE to perform a handover to the BS B on the frequency B based on the AMF request (received in the initial UE context setup request message). Alternatively, the BS A may configure the UE for dual-connectivity or carrier aggregation to access the network slice B on the frequency B based on the AMF request. The UE may perform the handover, dual-connectivity, or carrier aggregation as instructed by the BS A and in coordination with the BS A, the BS B, and/or the core network. For dual-connectivity, the UE may continue to be served by the BS A over the frequency A and additionally served by the BS B over the frequency B. For carrier aggregation, the UE may continue to be served by the BS A over the frequency A and additionally served by the BS A over the frequency B.

At step 740, after performing a handover, a dual-connectivity, or a carrier aggregation to access the frequency B, the UE transmits another NAS registration request message to the core network via the BS B. The NAS registration request message may include requested-NSSAI indicating the slice B and the slice A.

At step 745, in response to the NAS registration request message, the core network transmits a NAS registration response message to the UE via the BS B. The NAS registration response message may include allowed NSSAI indicating the slice B.

At step 750, the UE activates a PDU session over the slice B, for example, in coordination with the BS B and the core network. The UE may transmit a PDU session request to establish a PDU session over the slice B. The UE may receive a PDU session response indicating a successful establishment of the PDU session.

Figure 8:
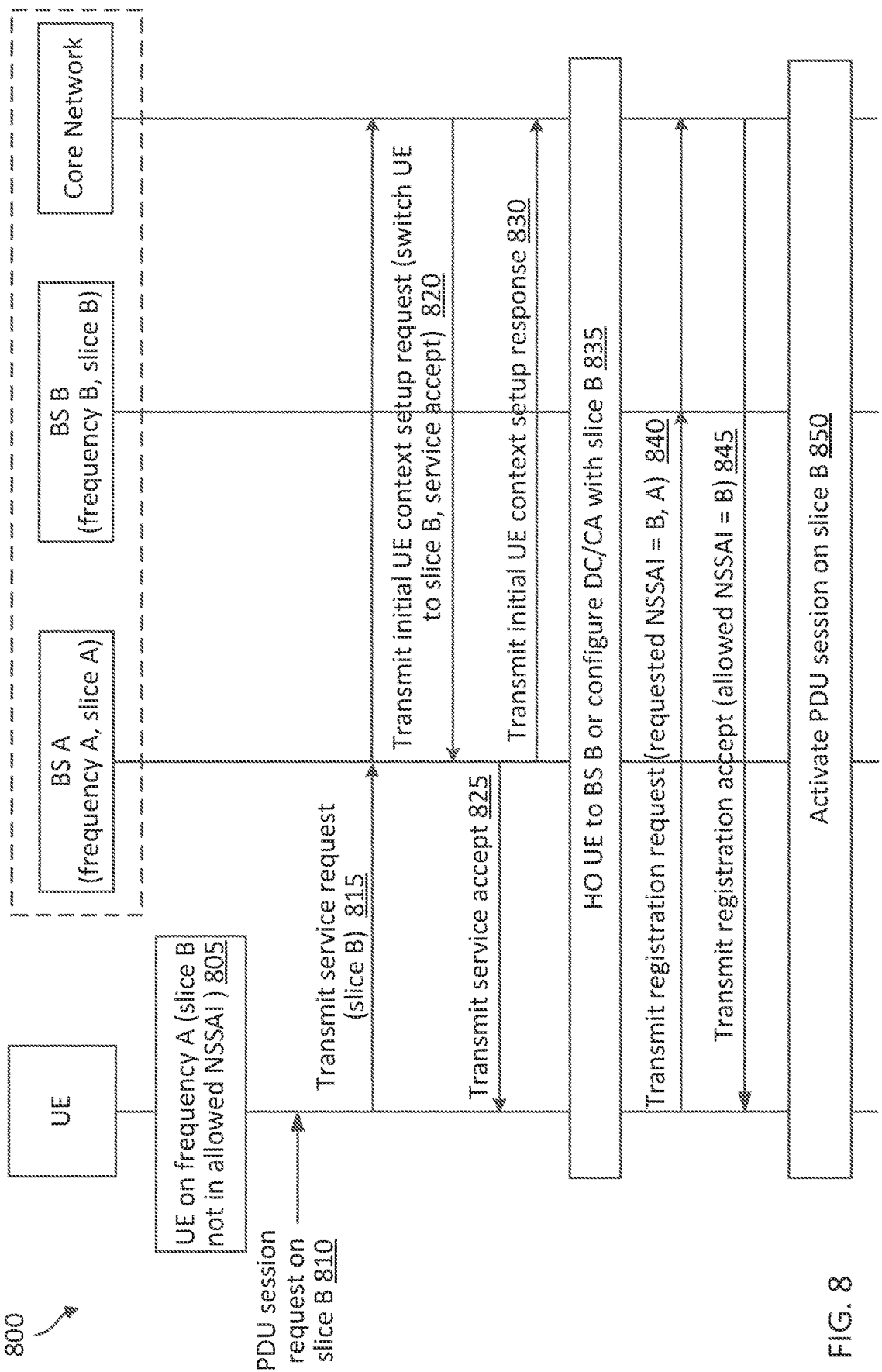
FIG. 8 is a signaling diagram illustrating a network slicing provisioning method according to some embodiments of the present disclosure.

FIG. 8 is a signaling diagram illustrating a network slicing provisioning method 800 according to some embodiments of the present disclosure. The method 800 may be implemented by a UE, a BS A, a BS B, and a core network. The UE may be similar to the UEs 115, 215, and/or 400. The BS A and the BS B may be similar to the BSs 105, 205, and/or 500. The BS A may operate over a frequency A (e.g., the frequency carrier 220) supporting a network slice A (e.g., an eMBB slice similar to the slice 250). The BS B may operate over a frequency B (e.g., the frequency carrier 222) supporting a network slice B (e.g., an URLLC slice similar to the slice 252). The core network may be similar to the core network 230 and may include one or more network components to the network unit 600. In an example, the core network may include an AMF component (e.g., the network unit 600) that implements the method 800. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 805, the UE is associated with frequency A, where slice B is not included in allowed NSSAI for frequency A. The UE may have performed a NAS registration with the core network via the BS A over the frequency A. In an example, the UE may have requested the slice A, but not the slice B during registration. In an example, the UE may have requested the slice A and the slice B, but may not have indicated that the slice B has a higher priority than the slice A.

At step 810, the UE receives a PDU session request on the slice B, for example, initiated by an application requiring a service (e.g., an URLLC service) on the slice B or by a higher layer OS of the UE.

At step 815, the UE transmits a NAS service request message to the core network via the BS A. The NAS service request message may request for slice B.

At step 820, the core network transmits an initial UE context setup request message to the BS A. The initial UE context setup request message may instruct the BS A to switch the UE to the frequency B where slice B is provided. The initial UE context setup request message may include a NAS service accept message.

At step 825, upon receiving the initial UE context setup request message from the core network, the BS A transmits a NAS service accept message to the UE. At step 830, the BS A transmits an initial UE context setup response message to the core network accepting the initial UE context setup request.

At step 835, the BS A may instruct the UE to perform a handover to the BS B on the frequency B based on the initial UE context setup request. Alternatively, the BS A may configure the UE for dual-connectivity or carrier aggregation to access the network slice B on the frequency B based on the initial UE context setup request. The UE may perform the handover, dual-connectivity, or carrier aggregation as instructed by the BS A and in coordination with the BS A, the BS B, and/or the core network.

At step 840, after performing the handover, the dual-connectivity, or the carrier aggregation to access the frequency B, the UE transmits another NAS registration request message to the core network via the BS B. The NAS registration request message may include requested-NSSAI indicating the slice B and the slice A.

At step 845, in response to the NAS registration request message, the core network transmits a NAS registration response message to the UE via the BS B. The NAS registration response message may include allowed NSSAI indicating the slice B.

At step 850, the UE activates a PDU session over the slice B, for example, in coordination with the BS B and the core network. The UE may transmit a PDU session request to establish a PDU session over the slice B. The UE may receive a PDU session response indicating a successful establishment of the PDU session.

In an example, after completing the service on slice B, the UE may request to return to slice A via a NAS service request in a similar manner as shown by the steps 815-850 of the method 800.

Figure 9A:
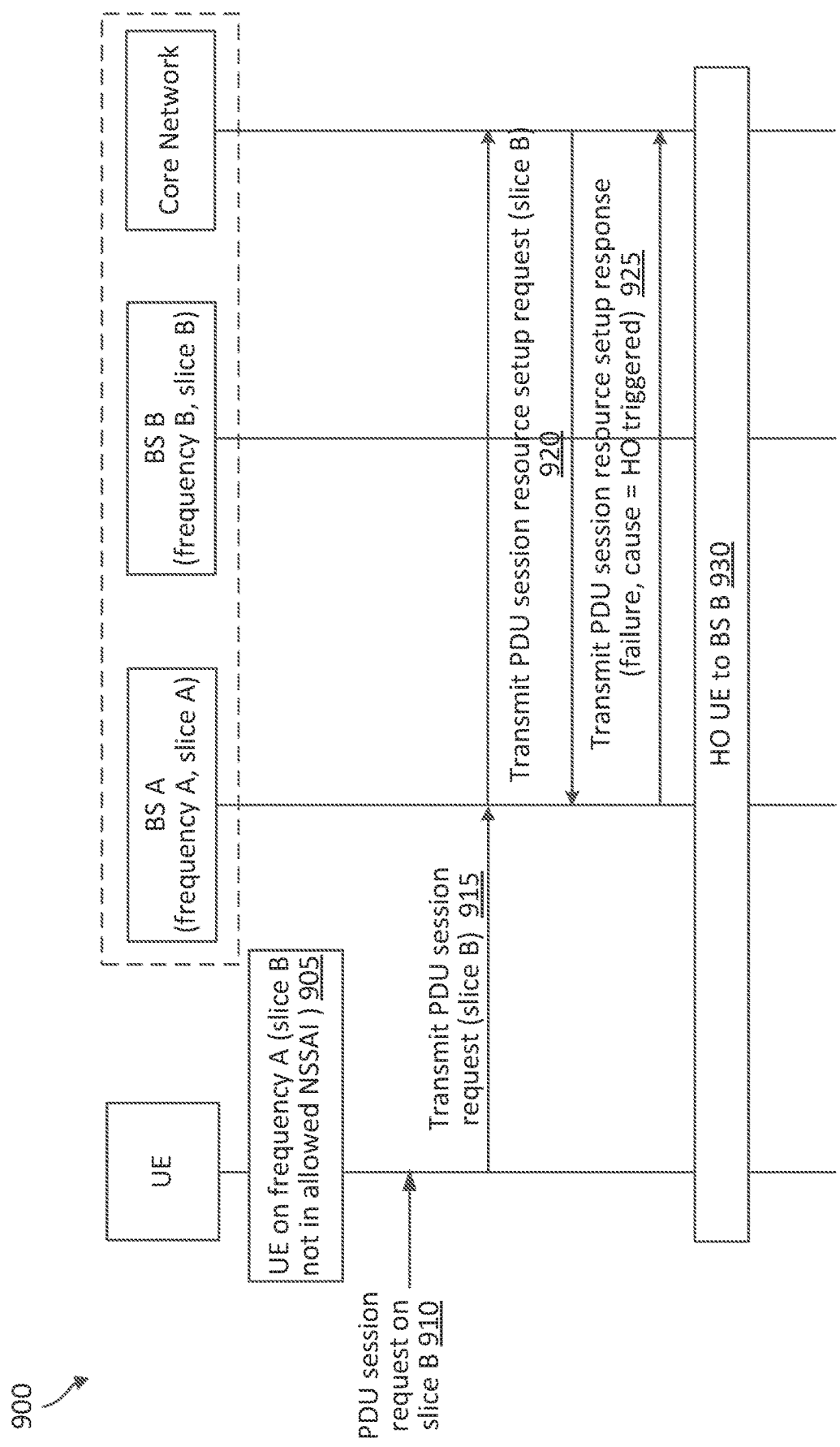
FIG. 9A is a signaling diagram illustrating a network slicing provisioning method according to some embodiments of the present disclosure.
Figure 9B:
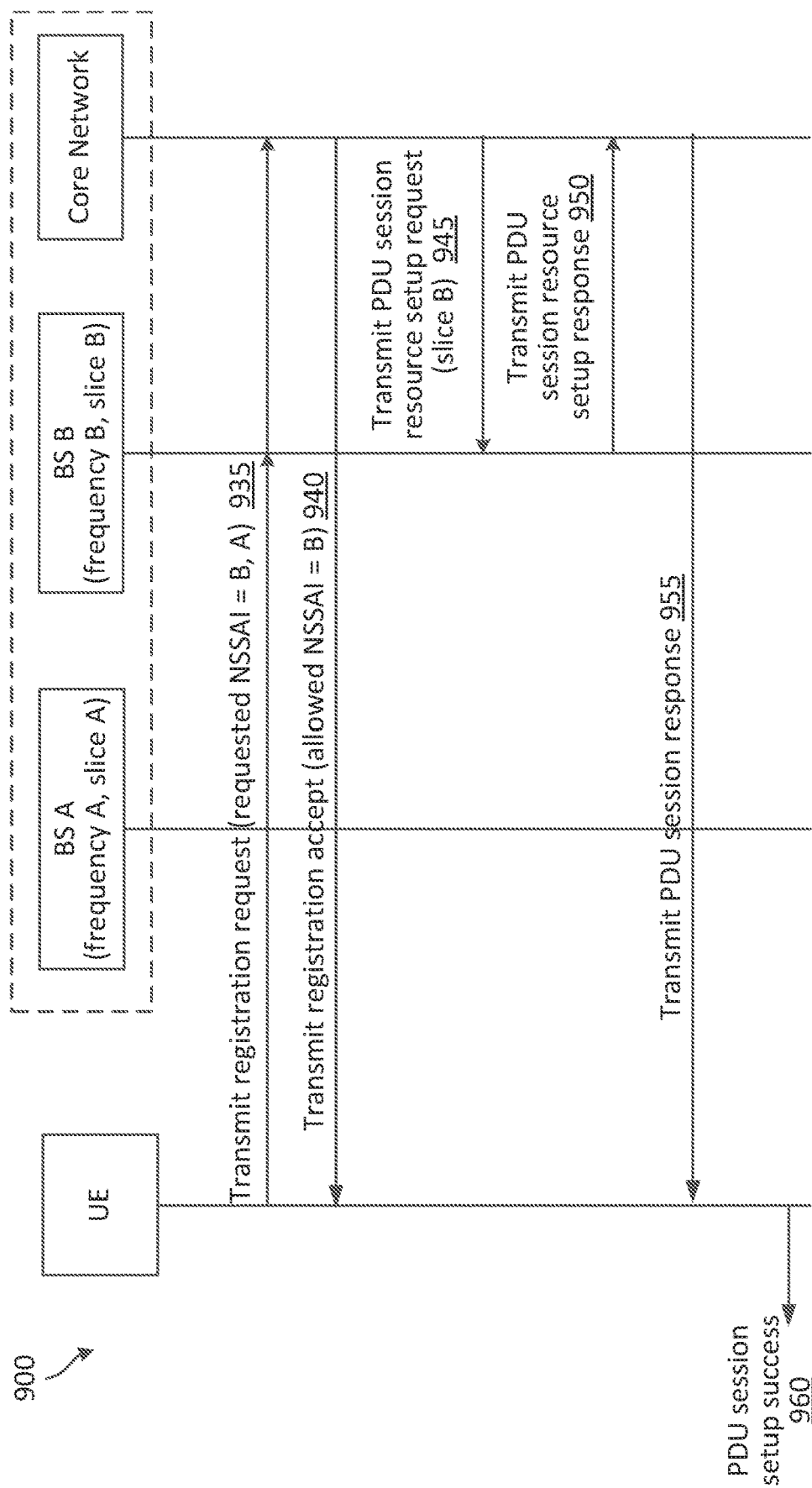
FIG. 9B is a signaling diagram illustrating a network slicing provisioning method according to some embodiments of the present disclosure.

FIGS. 9A and 9B are signaling diagrams that collective illustrates a network slice provisioning method 900 according to some embodiments of the present disclosure. The method 800 may be implemented by a UE, a BS A, a BS B, and a core network. The UE may be similar to the UEs 115, 215, and/or 400. The BS A and the BS B may be similar to the BSs 105, 205, and/or 500). The BS A may operate over a frequency A (e.g., the frequency carrier 220) supporting a network slice A (e.g., an eMBB slice similar to the slice 250). The BS B may operate over a frequency B (e.g., the frequency carrier 222) supporting a network slice B (e.g., an URLLC slice similar to the slice 252). The core network may be similar to the core network 230 and may include one or more network components to the network unit 600. In an example, the core network may include an AMF component (e.g., the network unit 600) that implements the method 900. As illustrated, the method 900 includes a number of enumerated steps, but embodiments of the method 900 may include additional steps before, after, and in between the enumerated steps. In some embodiments, one or more of the enumerated steps may be omitted or performed in a different order.

Referring to FIG. 9A, at step 905, the UE is associated with frequency A, where slice B is not included in allowed NSSAI for frequency A. The UE may have performed a NAS registration with the core network via the BS A over the frequency A. In an example, the UE may have requested the slice A, but not the slice B during registration. In an example, the UE may have requested the slice A and the slice B, but may not have indicated that the slice B has a higher priority than the slice A.

At step 910, the UE receives a PDU session request on the slice B, for example, initiated by an application requiring a service (e.g., an URLLC service) on the slice B or by a higher layer OS of the UE.

At step 915, the UE transmits a PDU session request message to the core network via the BS A. The PDU session request message may request for slice B. In an example, the UE may transmit the PDU session request for the slice B when the E determines that the slice B has a higher priority than the slice A and/or determines that the slice B in a coverage area (e.g., the area 210) of a cell frequency providing the slice B base on measurement information and/or received system information (e.g., from previous SIB reception or registration).

At step 920, the core network transmits a PDU session resource setup request message to the BS A. The PDU session resource setup request message may request the BS A to setup resources for slice B.

At step 925, in response to the PDU session resource setup request message, the BS A transmits a PDU session resource setup response message to the core network. The PDU session resource setup response message may indicate a failure since the BS A does not support the slice B over the frequency A. The PDU session resource setup response message may indicate a cause or reason for the failure and indicate that a handover trigger is required.

At step 930, the BS A may instruct the UE to perform a handover or redirection to the BS B on the frequency B. The UE may perform the handover as instructed by the BS A and in coordination with the BS A, the BS B, and/or the core network. In some instances, the redirection may refer to a radio resource control (RRC) release with redirection.

Referring to FIG. 9B, at step 935, after performing the handover, the dual-connectivity, or the carrier aggregation to access the frequency B, the UE transmits another NAS registration request message to the core network via the BS B. The NAS registration request message may include requested-NSSAI indicating the slice B and the slice A.

At step 940, in response to the NAS registration request message, the core network transmits a NAS registration response message to the UE via the BS B. The NAS registration response message may include allowed NSSAI indicating the slice B.

At step 945, the core network transmits a PDU session resource setup request message to the BS B. The PDU session resource setup request message may request the BS B to setup resources for slice B.

At step 950, in response to the PDU session resource setup request message, the BS B transmits a PDU session resource setup response message to the core network. The PDU session resource setup response message may indicate a success or completion of the resource setup.

At step 955, upon receiving the PDU session resource setup response message, the core network transmits a PDU session response message to the UE via the BS B. The PDU session resource setup response message may indicate a successful completion of the PDU session establishment.

At step 960, upon receiving the PDU session response message with a success from the core network, the UE may respond to the application or the OS with a PDU session setup success. Subsequently, the UE (or the application) may execute a service (e.g., the URLLC service) over the PDU session on the slice B.

In an example, when the handover or redirection of the UE to the frequency B in the step 930 fails, the core network may still accept the PDU session on the slice B, but may keep the PDU session on the slice B in a dormant state (e.g., an inactive state). The UE may activate the PDU session via a NAS service request at a later time.

As can be observed from the method 900, the method 900 allows a UE to request for a PDU session on a network slice (e.g., the network slice 250) that is not in allowed NSSAI.

Figure 10:
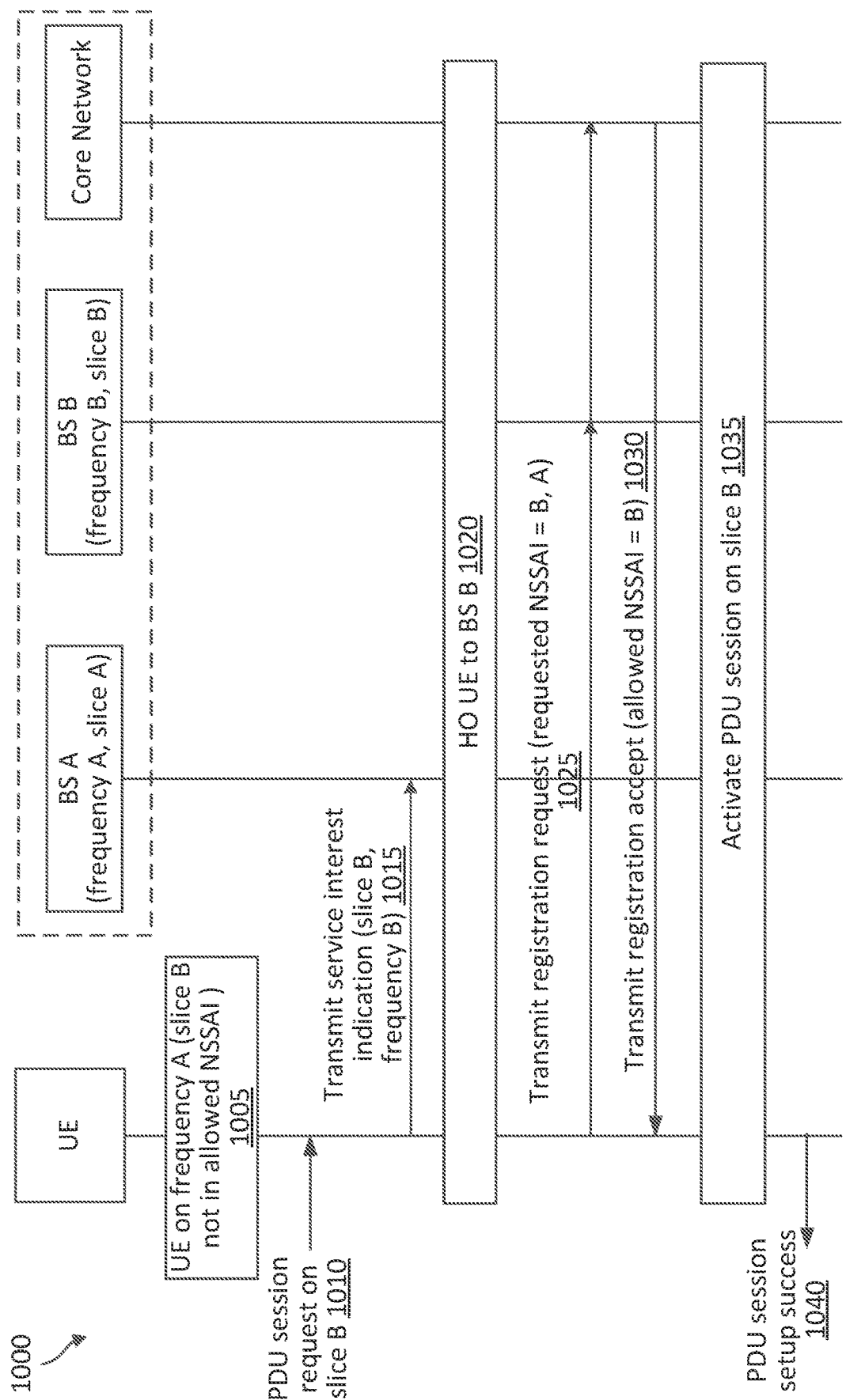
FIG. 10 is a signaling diagram illustrating a network slicing provisioning method according to some embodiments of the present disclosure.

FIG. 10 is a signaling diagram illustrating a network slicing provisioning method 1000 according to some embodiments of the present disclosure. The method 1000 may be implemented a UE, a BS A, a BS B, and a core network. The UE may be similar to the UEs 115, 215, and/or 400. The BS A and the BS B may be similar to the BSs 105, 205, and/or 500. The BS A may operate over a frequency A (e.g., the frequency carrier 220) supporting a network slice A (e.g., an eMBB slice similar to the slice 250). The BS B may operate over a frequency B (e.g., the frequency carrier 222) supporting a network slice B (e.g., an URLLC slice similar to the slice 252). The core network may be similar to the core network 230 and may include one or more network components to the network unit 600. In an example, the core network may include an AMF component (e.g., the network unit 600) that implements the method 1000. As illustrated, the method 1000 includes a number of enumerated steps, but embodiments of the method 1000 may include additional steps before, after, and in between the enumerated steps. In some embodiments, one or more of the enumerated steps may be omitted or performed in a different order. Similar to the methods 700, 800, and/or 900, the method 1000 allows a UE to request a network slice that is not in allowed NSSAI. However, the method 1000 utilizes RRC signaling instead of NAS signaling.

At step 1005, the UE is associated with frequency A, where slice B is not included in allowed NSSAI for frequency A. The UE may have performed a NAS registration with the core network via the BS A over the frequency A. In an example, the UE may have requested the slice A, but not the slice B during registration. In an example, the UE may have requested the slice A and the slice B, but may not have indicated that the slice B has a higher priority than the slice A.

At step 1010, the UE receives a PDU session request on the slice B, for example, initiated by an application requiring a service (e.g., an URLLC service) on the slice B or by a higher layer OS of the UE.

At step 1015, the UE transmits a service interest indication message to the BS A. The service interest indication message may indicate the slice B. In an example, the service interest indication message may include a list of UE interested network slices and/or priorities of the network slices. In an example, that the service interest indication message may include a list of UE interested frequencies (e.g., the frequency carriers 220 and 222). In an example, the service interest indication message may include a list of UE interested network slices, priorities of the network slices, and/or the list of UE interested frequencies. The service interest indication message is a RRC message e.g., a RRC multimedia broadcast multicast serve (MBMS) message).

At step 1020, upon receiving the service interest indication message, the BS A may instruct the UE to perform a handover to the BS B on the frequency B where the slice B is served. The UE may perform the handover to the BS B as instructed by the BS A and in coordination with the BS A, the BS B, and/or the core network.

At step 1025, after performing the handover to the frequency B, the UE transmits another NAS registration request message to the core network via the BS B. The NAS registration request message may include requested-NSSAI indicating the slice B and the slice A.

At step 1030, in response to the NAS registration request message, the core network transmits a NAS registration response message to the UE via the BS B. The NAS registration response message may include allowed NSSAI indicating the slice B.

At step 1035, the UE activates a PDU session over the slice B, for example, in coordination with the BS B and the core network. The UE may transmit a PDU session request to establish a PDU session over the slice B. The UE may receive a PDU session response indicating a successful establishment of the PDU session.

At step 1040, after activating the PDU session over the slice B, the UE may respond to the application or the OS with a PDU session activated. Subsequently, the UE (or the application) may execute a service (e.g., the URLLC service) over the PDU session on the slice B.

In an example, during an RRC release or RRC resume, the BS may assign dedicated priority based on UE interested slices and/or frequencies received from the RRC service interest indication message. For example, the dedicated priority may include frequency priority information that the UE may use during cell reselection while the UE is in an RRC idle state and/or RRC inactive state. The frequency priority information may be included in the RRC release message. Additionally, the BS may take the UE's interested slices into consideration for performing mobility (e.g., target cell selection) while the UE is in an RRC connected state.

Figure 11:
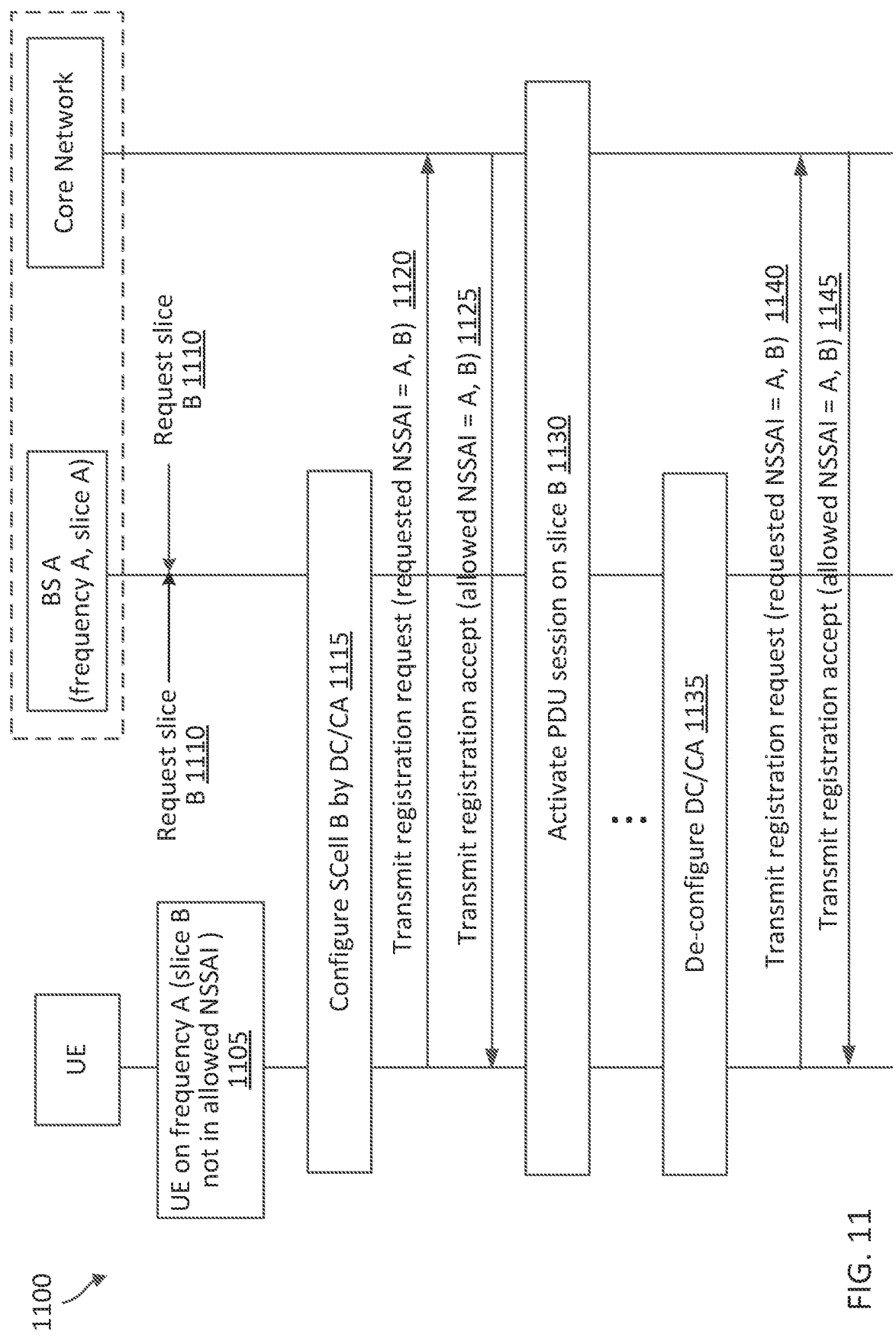
FIG. 11 is a signaling diagram illustrating a network slicing provisioning method according to some embodiments of the present disclosure.

FIG. 11 is a signaling diagram illustrating a network slicing provisioning method 1100 according to some embodiments of the present disclosure. The method 1100 may be implemented a UE, a BS A, and a core network. The UE may be similar to the UEs 115, 215, and/or 400. The BS A may be similar to the BSs 105, 205, and/or 500. The BS A may operate over a frequency A (e.g., the frequency carrier 220) supporting a network slice A (e.g., an eMBB slice similar to the slice 250). A network slice B (e.g., an URLLC slice similar to the slice 252) may be supported over a frequency B (e.g., the frequency carrier 222) different form the frequency A. The core network may be similar to the core network 230 and may include one or more network components to the network unit 600. In an example, the core network may include an AMF component (e.g., the network unit 600) that implements the method 1100. As illustrated, the method 1100 includes a number of enumerated steps, but embodiments of the method 1100 may include additional steps before, after, and in between the enumerated steps. In some embodiments, one or more of the enumerated steps may be omitted or performed in a different order. The method 1100 may be used in conjunction with the method 700 and/or 800 as described above with respect to FIGS. 7 and 8, respectively. The method 1100 provides a more detailed view for supporting a network slice that is not in allowed NSSAI via dual-connectivity and/or carrier aggregation.

At step 1105, the UE is associated with frequency A, where slice B is not included in allowed NSSAI for frequency A. The UE may have performed a NAS registration with the core network via the BS A over the frequency A. In an example, the UE may have requested the slice A, but not the slice B during registration. In an example, the UE may have requested the slice A and the slice B, but may not have indicated that the slice B has a higher priority than the slice A.

At step 1110, the BS A receives a request for the slice B. In an example, the slice B request may be initiated by the UE (e.g., based on the UE receiving a request for the slice B from higher layer application or a service of the UE). In an example, the slice B request may be initiated by the core network. In general, the slice B request can be initiated by any entity in the network.

At step 1115, the BS A may configure the UE with a secondary cell (SCell) B over the frequency B via dual-connectivity or carrier aggregation. The UE may perform the dual-connectivity or carrier aggregation to access the S Cell on the frequency B. The frequency A may be referred to as a primary cell (PCell)

At step 1120, after performing the dual-connectivity or carrier aggregation, the UE transmits a NAS registration request message to the core network, for example, via the SCell. The NAS registration request message may include requested-NSSAI indicating the slice B and the slice A.

At step 1125, in response to the NAS registration request message, the core network transmits a NAS registration response message to the UE for example, via the SCell. The NAS registration response message may include allowed NSSAI indicating the slice B.

At step 1130, the UE activates a PDU session over the slice B. The UE may transmit a PDU session request to establish a PDU session over the slice B. The UE may receive a PDU session response indicating a successful establishment of the PDU session. Subsequently, the UE may be served a service (e.g., an URLLC service) in the PDU session over the slice B in the SCell.

After some time, at step 1135, the BS A may de-configure the dual-connectivity or carrier aggregation. In other words, the BS A de-configure the UE from being served by the SCell on the frequency B.

At step 1140, after the de-configuration, the UE transmits another NAS registration request message to the core network, for example, via the PCell on the frequency A. The NAS registration request message may include requested-NSSAI indicating the slice A and the slice B.

At step 1145, in response to the NAS registration request message, the core network transmits a NAS registration response message to the UE for example, via the PCell on the frequency A. The NAS registration response message may include allowed NSSAI indicating the slice A.

In an example, when the UE detects that a dual-connectivity or carrier aggregation configuration or de-configuration may impact network slice support capability or status change, the UE may initiate a NAS registration to update allowed NSSAI. As shown above, at the step 1105, the UE may have stored allowed NSSAI indicating the slice A. After the dual-connectivity or carrier aggregation configuration at step 1115, the UE initiated a NAS registration and obtained updated allowed NSSAI indicating the slice B. After the dual-connectivity or carrier aggregation de-configuration at step 1135, the UE initiated a NAS registration and obtained updated allowed NSSAI indicating the slice A. In an example, the network may configure the UE to trigger a NAS registration after a dual-connectivity or carrier aggregation configuration and/or after a dual-connectivity or carrier aggregation de-configuration so that the UE may obtained updated allowed NSSAI including the slice B.

In some examples, when the RAN (e.g., the BS A) determines that the availability status of the UE's interested network slice may change after a dual-connectivity or carrier aggregation configuration (e.g., at the step 1115) or after a dual-connectivity or carrier aggregation de-configuration (e.g., at the step 1135), the RAN may indicate to the core network that the availability status of the UE's interested slice has changed so that the core network may update the allowed NSSAI.

In an example, if the UE requested multiple slices (e.g., the slices 250 and 252) or frequencies (e.g., the frequency carriers 220 and 222) that may be supported by a single cell, the BS may attempt to meet the request by configuring the UE with multiple SCells through dual-connectivity or carrier aggregation. If dual-connectivity or carrier aggregation with SCells does not meet the request, the BS may redirect or handover the UE to a frequency that supports a highest priority network slice (that the UE is most interested in).

Figure 12:
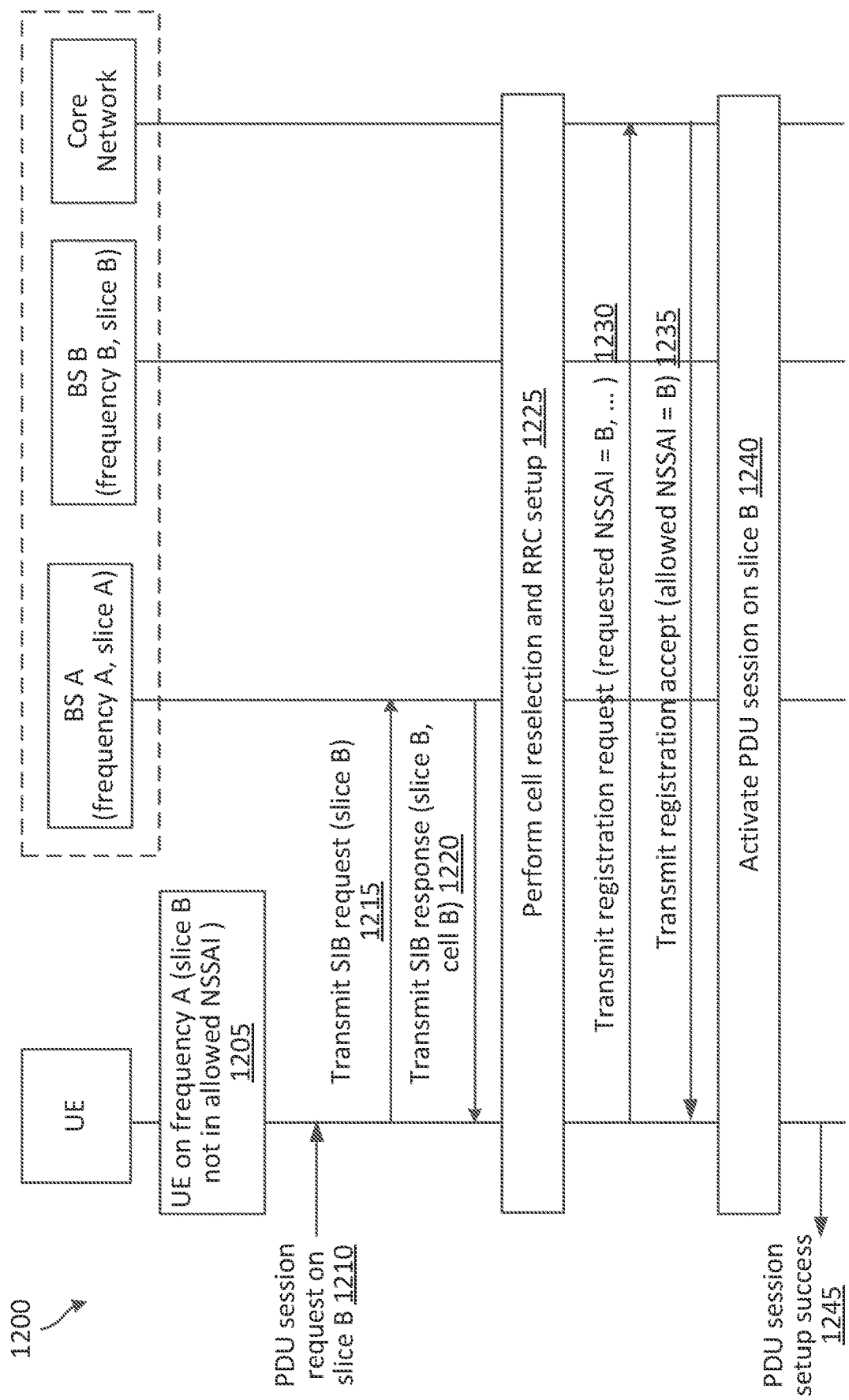
FIG. 12 is a signaling diagram illustrating a network slicing provisioning method according to some embodiments of the present disclosure.

FIG. 12 is a signaling diagram illustrating a network slicing provisioning method 1200 according to some embodiments of the present disclosure. The method 1200 may be implemented by a UE, a BS A, a BS B, and a core network. The UE may be similar to the UEs 115, 215, and/or 400. The BS A and the BS B may be similar to the BSs 105, 205, and/or 500. The BS A may operate over a frequency A (e.g., the frequency carrier 220) supporting a network slice A (e.g., an eMBB slice similar to the slice 250). The BS B may operate over a frequency B (e.g., the frequency carrier 222) supporting a network slice B (e.g., an URLLC slice similar to the slice 252). The core network may be similar to the core network 230 and may include one or more network components to the network unit 600. In an example, the core network may include an AMF component (e.g., the network unit 600) that implements the method 1200. As illustrated, the method 1200 includes a number of enumerated steps, but embodiments of the method 1200 may include additional steps before, after, and in between the enumerated steps. In some embodiments, one or more of the enumerated steps may be omitted or performed in a different order. The method 1200 provides network slice-to-frequency mapping via an on-demand SIB request.

At step 1205, the UE is camped on frequency A, where slice B is not included in allowed NSSAI for frequency A. In an example, the UE may be in an RRC idle mode. The UE may have received system information (e.g., SIBs) from the BS A. The UE may have received allowed NSSAI for the currently camped frequency A (e.g., from a previous connection to the network and/or previous monitoring).

At step 1210, the UE receives a PDU session request on the slice B, for example, initiated by an application requiring a service (e.g., an URLLC service) on the slice B or by a higher layer OS of the UE.

At step 1215, the UE transmits a SIB request message in the frequency A to the BS A. The SIB request may request for information (e.g., slice-to-frequency mapping information) for the slice B. For example, the UE determines that the slice B is not in the current allowed NSSAI (e.g., over the currently camped frequency A). The UE may transmit the SIB request message via a random access procedure. For example, the UE may transmit the SIB request message in a MSG 1, MSG 3, or a MSG A.

At step 1220, in response to the SIB request, the BS A transmits a SIB response message indicating slice B information, for example, indicating the frequency B where the slice B is supported. In an example, the BS may transmit the SIB response message via a MSG 2, MSG 4, or a MSG B. In an example, a SIB with slice-to-frequency mapping may be too large to be transmitted over the air interface. The BS A may include a subset of the slice-to-frequency mapping SIB in the SIB response message.

At step 1225, after receiving the frequency mapping information for the slice B, the UE performs a cell reselection to reselect to the frequency B. The UE may perform an RRC connection setup with the BS B based on the reselection to the frequency B. The RRC connection setup may include the exchange of random access messages (e.g., the four-step random access or the two-step random access)

At step 1230, after reselecting to the frequency B and performing the RRC connection setup, the UE transmits another NAS registration request message to the core network via the BS B. The NAS registration request message may include requested-NSSAI indicating the slice B and the slice A.

At step 1235, in response to the NAS registration request message, the core network transmits a NAS registration response message to the UE via the BS B. The NAS registration response message may include allowed NSSAI indicating the slice B.

At step 1240, the UE activates a PDU session over the slice B, for example, in coordination with the BS B and the core network. The UE may transmit a PDU session request to establish a PDU session over the slice B. The UE may receive a PDU session response indicating a successful establishment of the PDU session.

At step 1245, after activating the PDU session over the slice B, the UE may respond to the application or the OS with a PDU session activated. Subsequently, the UE (or the application) may execute a service (e.g., the URLLC service) over the PDU session on the slice B.

As can be observed form the method 1200, the UE may perform cell reselection based on based on a service requirement. The UE may take interested network slices into consideration for cell reselection. For example, when the UE is interested in an URLLC service and an URLLC slice (e.g., the slice 252) in not allowed in the currently camped frequency, the UE may reselect to a cell frequency (e.g., the frequency carrier 222) that supports an URLLC slice. Alternatively, when the UE is interested in an eMBB service (e.g., the frequency carrier 222) and an eMBB slice (e.g., the slice 250) in not allowed in the currently camped frequency, the UE may reselect to a cell frequency that supports an eMBB slice. The UE can request a BS on a currently camped cell to provide additional SIB on demand based on an initiation from an application. In other words, the UE can perform BS assisted service cell reselection. While the method 1200 is described in the context of cell reselection, the UE may perform a service-based BS-assisted cell selection using substantially similar mechanisms as in the method 1200.

Figure 13A:
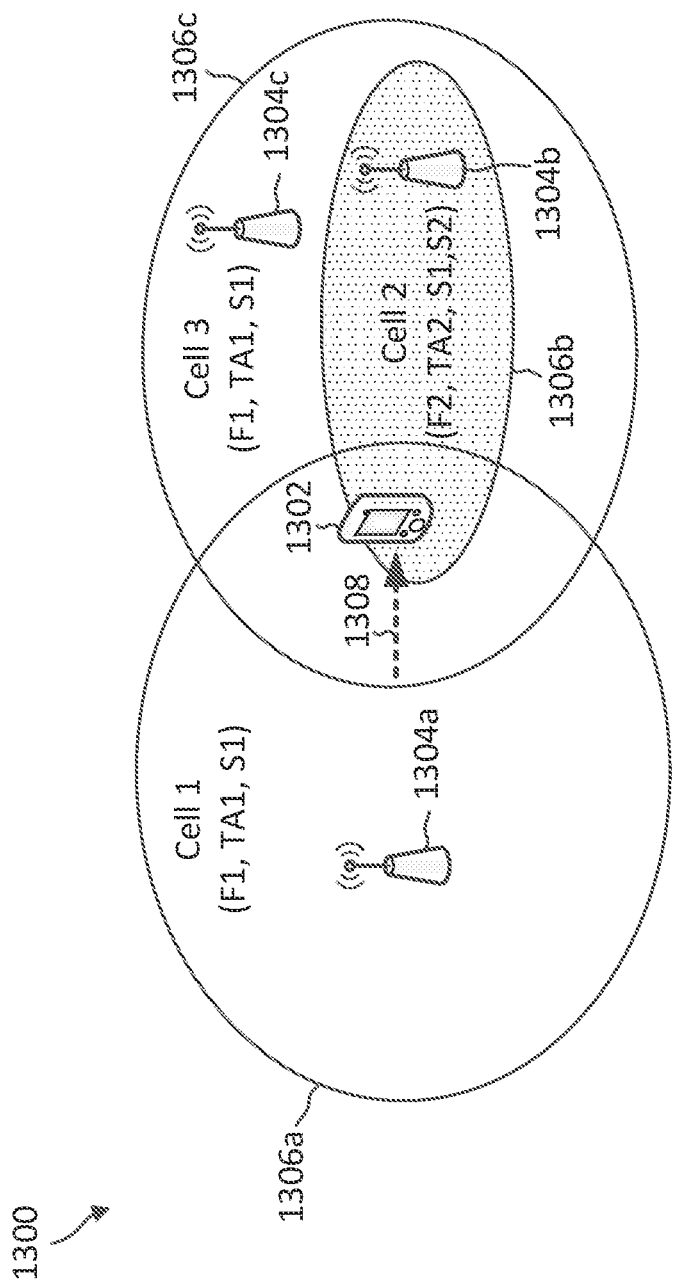
FIG. 13A illustrates a network slice-aware handover scenario with network slicing according to some embodiments of the present disclosure.
Figure 13B:
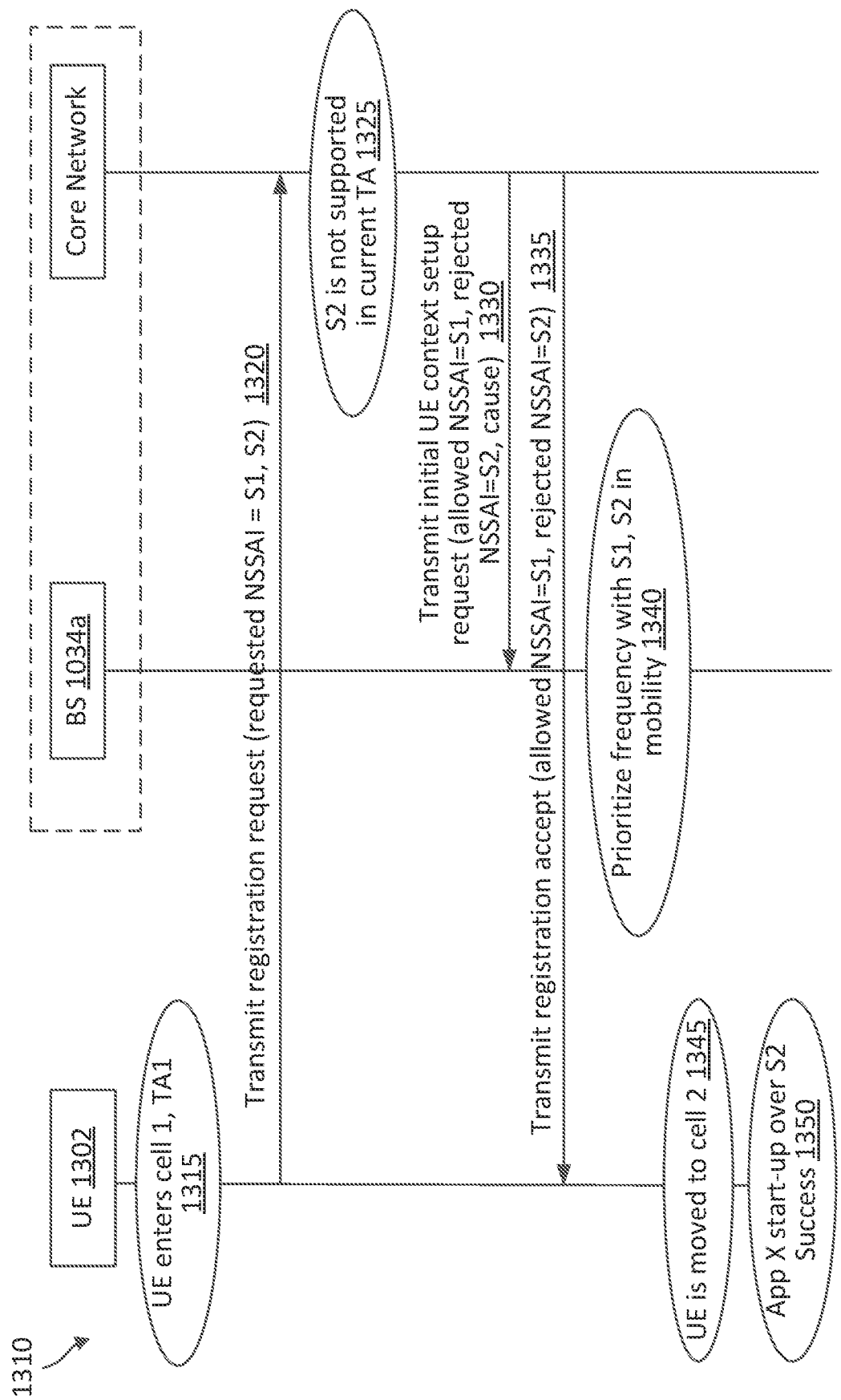
FIG. 13B is a signaling diagram illustrating a network slice-aware handover method according to some embodiments of the present disclosure.

FIGS. 13A and 13B collectively illustrate mechanisms for performing a network slice-aware mobility. FIG. 13A illustrates a handover scenario 1300 with network slicing according to some embodiments of the present disclosure. FIG. 13B is a signaling diagram illustrating a network slice-aware handover method 1310 according to some embodiments of the present disclosure.

Referring to FIG. 13A, the handover scenario 1300 may correspond to a scenario in the network 100. In the handover scenario 1300, a cell 1306a (denoted as Cell 1) operates over a carrier frequency F1 (e.g., the frequency carrier 220) in a tracking area T1 and provides a slice S1 (e.g., an eMBB slice similar to the slice 250). A cell 1306b (denoted as Cell 3) operates over a carrier frequency F2 (e.g., the frequency carrier 222) in the tracking area T2 and provides a slice S1 and a slice S2 (e.g., an URLLC slice similar to the slice 252). A cell 1306b (denoted as Cell 2) also operates over the carrier frequency F1 in the tracking area T1 and provides a slice S1. The cell 1306a may be operated by a BS 1304a, the cell 1306b may be operated by a BS 1304b, and the cell 1306c may be operated by a BS 1304c. The BSs 1304a, 1304b, and 1304c may be substantially similar to the BSs 105, 205, and/or 500.

A UE 1302 (e.g., the UEs 115, 215, and/or 500) may be camped on the cell 1306a. The UE 1302 may be interested in a slice S1 and a slice S2. The BS 1304a may be provided with information related to the UE's interest in slice S1 and slice S2 as described in greater detail below in the method 1310. Accordingly, the BS 1304a may handover the UE 1302 to the cell 1306b (shown by the dashed arrow 1308) instead of the cell 1306c based on the UE's network slice interest information. The BS 1304a may select the cell 1306b based on a match of the UE's interested slice S1 and slice S2 to the slice S1 and slice S2 supported by the frequency F2 over the cell 1306b.

Referring to FIG. 13B, the method 1310 may be implemented by the UE 1302, the BS 1304a, and a core network. The core network may be similar to the core network 230 and may include one or more network components to the network unit 600. In an example, the core network may include an AMF component (e.g., the network unit 600) that implements the method 1310. The method 1310 illustrates the signaling for providing the BS 1304a with the UE 1302's network slice interest for network slice-aware mobility. As illustrated, the method 1310 includes a number of enumerated steps, but embodiments of the method 1310 may include additional steps before, after, and in between the enumerated steps. In some embodiments, one or more of the enumerated steps may be omitted or performed in a different order.

At step 1315, the UE 1302 enters cell 1 (e.g., the cell 1306a) in the tracking area T1. The UE 1302 is interested in a slice S1 (e.g., an eMBB slice) and a slice S2 (e.g., an URLLC slice).

At step 1320, the UE 1302 transmits a NAS registration request message to the AMF via the BS 1304a. The NAS registration request message may include requested-NSSAI indicating a slice S1 and a slice S2.

At step 1325, the AMF determines that the slice S2 in the requested-NSSAI is not supported in the current tracking area T1.

At step 1330, the AMF transmits an initial UE context setup request message to the BS 1304a. The initial UE context setup request message may include allowed NSSAI, rejected NSSAI, and a rejection cause. The allowed NSSAI may indicate the slice 1. The rejected NSSAI may indicate the slice S2. The rejection cause may indicate a reason for rejecting the slice S2. For example, the rejection cause may indicate that the current PLMN does not support the requested slice S2. Alternatively, the rejection cause may indicate that the current registration area (e.g., the registered tracking area) does not support the requested slice S2.

At step 1335, the AMF transmits a NAS registration accept message to the UE 1302 via the BS 1304a. The NAS registration accept message may include allowed NSSAI indicating the slice S1 and rejected NSSAI indicating the slice S2.

At step 1340, based on the rejection cause provided by the AMF in the initial UE context setup request message, the BS 1304a prioritizes frequency (e.g., the frequency F2) with support for the slices S1 and S2 for performing mobility for the UE 1302. For example, as shown in the scenario 1300, the BS 1304a handover the UE 1302 to the cell 1306b. The BS 1304a may direct the UE 1302 to the cell 1306a At step 1345, the UE 1302 performs handover to the cell 1306b. At step 1350, the UE 1302 may start or execute an application (denoted as App X) over the slice S2 with a success since the cell 1306b provides the slice.

As can be observed in the method 1310, the AMF (or the core network) transmits rejected NSSAI as well as the cause of the rejection to the BS 1304a (or the RAN). The rejected NSSAI and the rejection cause provides the RAN with information associated with information associated with a UE 1302's interested network slices. Accordingly, the BS 1304a or the RAN can support network slice-aware mobility. The network slice-aware mobility can provide the UE 1302 with dynamic slice request and a faster acquisition of a cell frequency that can provide a slice required by the UE.

Figure 14:
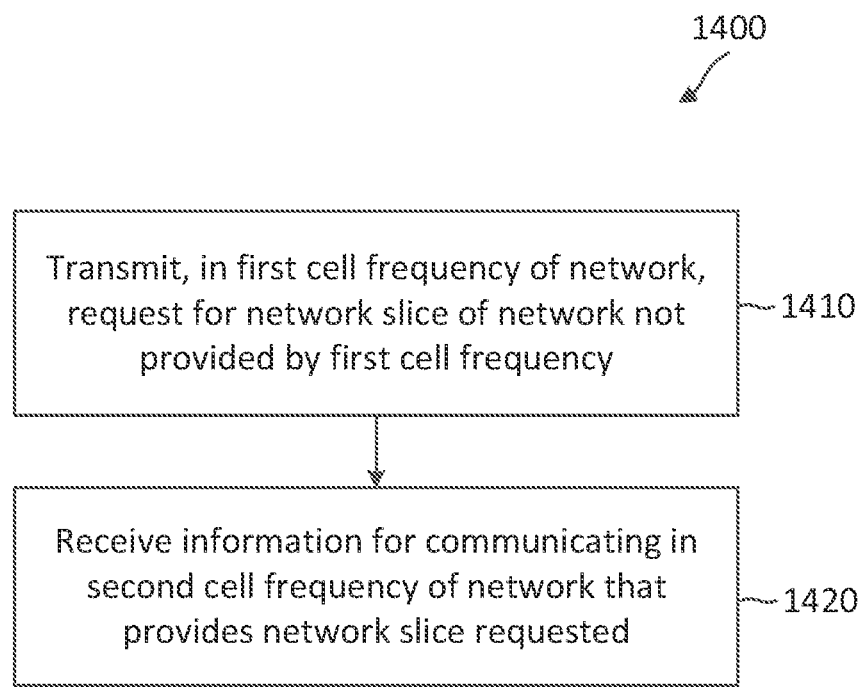
FIG. 14 is a flow diagram of a communication method according to some embodiments of the present disclosure.

FIG. 14 is a flow diagram of a communication method 1400 according to some embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115, UE 215, UE 400, and/or UE 1302, may utilize one or more components, such as the processor 402, the memory 404, the network slicing module 408, the transceiver 410, the modem 412, and the one or more antennas 416, to execute the steps of method 1400. The method 1400 may employ similar mechanisms as in the methods 700, 800, 900, 1000, 1200, and/or 1310 described above with respect to FIGS. 7, 8, 9, 10, 11, 12, and/or 13, respectively. As illustrated, the method 1400 includes a number of enumerated steps, but embodiments of the method 1400 include additional steps before, after, and in between the enumerated steps. In some embodiments, one or more of the enumerated steps may be omitted or performed in a different order.

At step 1410, the method 1400 includes transmitting, by the UE in a first cell frequency (e.g., the frequency carrier 220) a network (e.g., the networks 100 and/or 200), a request for a network slice (e.g., the network slice 252) of the network that is not provided by the first cell frequency.

At step 1420, the method 1400 includes receiving, by the UE in response to the request, information for communicating in a second cell frequency (e.g., the frequency carrier 222) of the network that provides the network slice requested.

In an embodiment, the transmitting includes transmitting, by the UE, a NAS registration request message including NSSAI, where the NSSAI indicates that the network slice requested is preferred over another network slice of the network, for example, as shown in the method 700.

In an embodiment, the transmitting includes transmitting, by the UE, a NAS service request message indicating the network slice that is not in allowed NSSAI (e.g., received during a NAS registration), for example, as shown in the method 800.

In an embodiment, the transmitting includes transmitting, by the UE, a PDU session request message indicating the network slice that is not in allowed NSSAI (e.g., received during a NAS registration), for example, as shown in the method 900.

In an embodiment, the transmitting includes transmitting, by the UE, an RRC message indicating an interest for the network slice, for example, as shown in the method 1000.

In an embodiment, the transmitting includes transmitting, by the UE, a system information request message requesting frequency information associated with the network slice. The receiving includes receiving, by the UE, a system information response message including the frequency information indicating that the network slice is provided by the second cell frequency, for example, as shown in the method 1200.

In an embodiment, the receiving includes receiving, by the UE, an instruction to perform at least one of a handover to the second cell frequency. In an embodiment, the receiving includes receiving, by the UE, an instruction to perform a dual-connectivity with the second cell frequency. In an embodiment, the receiving includes receiving, by the UE, an instruction to perform a carrier aggregation with the second cell frequency.

Figure 15:
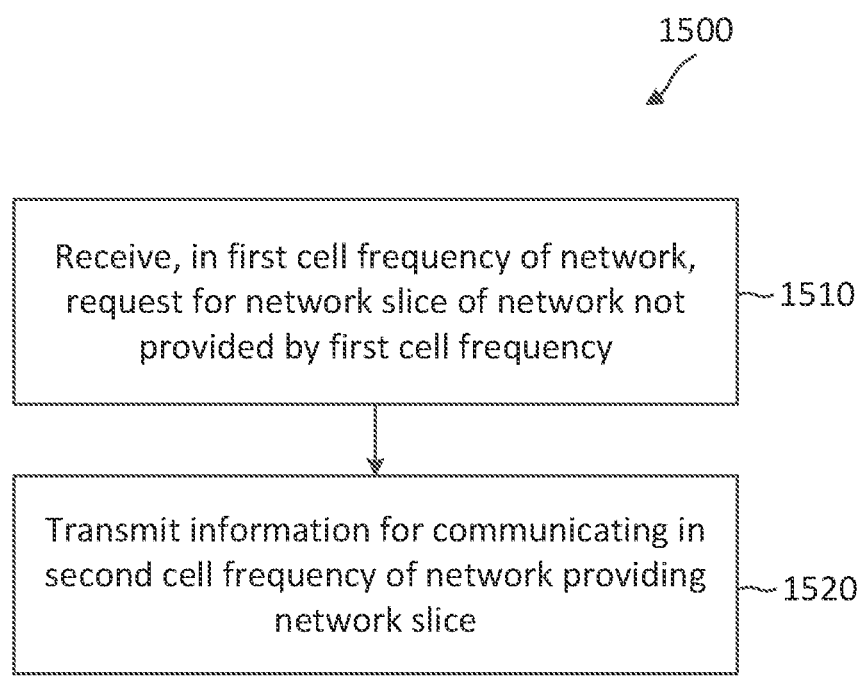
FIG. 15 is a flow diagram of a communication method according to some embodiments of the present disclosure.

FIG. 15 is a flow diagram of a communication method 1500 according to some embodiments of the present disclosure. Steps of the method 1500 can be executed by a computing device (e.g., a processor, processing circuit, and/or other suitable component) of a wireless communication device or other suitable means for performing the steps. For example, a network entity, such as the BS 105, 205, 500, and/or 1304, may utilize one or more components, such as the processor 502, the memory 504, the network slicing module 508, the transceiver 510, the modem 512, and the one or more antennas 516, to execute the steps of method 1500. Alternatively, a network entity, such as a core network 230 and/or the network unit 600, may utilize one or more components, such as the processor 602, the memory 604, the network slicing module 608, the transceiver 610, the modem 612, and the frontend 614, to execute the steps of method 1500. The method 1500 may employ similar mechanisms as in the methods 700, 800, 900, 1000, 1200, and/or 1310 described above with respect to FIGS. 7, 8, 9, 10, 11, 12, and/or 13, respectively. As illustrated, the method 1500 includes a number of enumerated steps, but embodiments of the method 1500 include additional steps before, after, and in between the enumerated steps. In some embodiments, one or more of the enumerated steps may be omitted or performed in a different order.

At step 1510, the method 1500 includes receiving, by a network entity from a UE (e.g., the UEs 115, 215, 400, and/or 1302) in a first cell frequency (e.g., the frequency carrier 220) of a network (e.g., the networks 100 and/or 200), a request for a network slice (e.g., the network slice 252) of the network, the network slice not provided by the first cell frequency.

At step 1520, the method 1500 includes transmitting, by the network entity to the UE, information for communicating in a second cell frequency (e.g., the frequency carrier 222) of the network providing the network slice.

In an embodiment, the receiving includes receiving, by the network entity from the UE, a NAS registration request message including NSSAI, the NSSAI indicating that the network slice requested is preferred over another network slice of the network, for example, as shown in the method 700. In an embodiment, the network entity may correspond to a BS (e.g., the BSs 105, 205, 500, and/or 1304). In such an embodiment, the network entity may relay, to a core network entity (e.g., the core network 230) of the network, the request and receive, from the core network entity, a message indicating that the UE prefers the network slice requested over the another network slice. In an embodiment, the network entity may be a core network entity (e.g., the core network 230). In such an embodiment, the receiving includes receiving, by the network entity, the request via a BS (e.g., the BSs 105, 205, 500, and/or 1304) operating over the first cell frequency and the network entity may transmit, to the BS, a message indicating that the UE prefers the network slice requested over the another network slice.

In an embodiment, the receiving includes receiving, by the network entity from the UE, a NAS service request message indicating the network slice that is not included in allowed NSSAI of the first cell frequency, for example, as shown in the method 800. In an embodiment, the network the network entity may correspond to a BS (e.g., the BSs 105, 205, 500, and/or 1304) and may relay, to a core network entity (e.g., the core network 230) of the network, the request, The network entity may receive, from the core network entity, an instruction to switch the UE to the second cell frequency. In an embodiment, the network entity may be a core network entity (e.g., the core network 230) and receive the request via a base station (BS) operating over the first cell frequency. The network entity may further transmit, to the BS, an instruction to switch the UE to the second cell frequency.

In an embodiment, the receiving includes receiving, by the network entity from the UE, a PDU session request message indicating the network slice that is not included in allowed NSSAI of the first cell frequency, for example, as shown in the method 900.

In an embodiment, the receiving includes receiving, by the network entity from the UE, an RRC message indicating an interest for the network slice, for example, as shown in the method 1000.

In an embodiment, the receiving includes receiving, by the network entity, a system information request message requesting frequency information associated with the network slice. The network entity further transmits a system information response message (e.g., a SIB) indicating that the network slice is provided by the second cell frequency, for example, as shown in the method 1200.

In an embodiment, the transmitting includes transmitting, by the network entity, an instruction to perform at least one of a handover to the second cell frequency. In an embodiment, the transmitting includes transmitting, by the network entity, an instruction to perform a dual-connectivity with the second cell frequency. In an embodiment, the transmitting includes transmitting, by the network entity, an instruction to perform a carrier aggregation with the second cell frequency.

Figure 16:
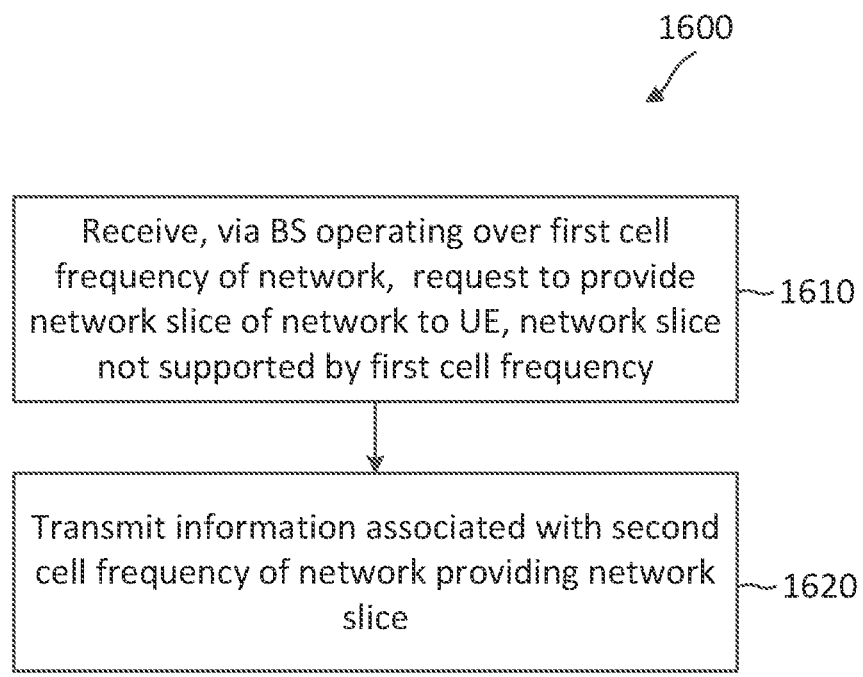
FIG. 16 is a flow diagram of a communication method according to some embodiments of the present disclosure.

FIG. 16 is a flow diagram of a communication method 1600 according to some embodiments of the present disclosure. Steps of the method 1600 can be executed by a computing device (e.g., a processor, processing circuit, and/or other suitable component) of a wireless communication device or other suitable means for performing the steps. For example, a core network entity, such as a core network 230 and/or the network unit 600, may utilize one or more components, such as the processor 602, the memory 604, the network slicing module 608, the transceiver 610, the modem 612, and the frontend 614, to execute the steps of method 1600. The method 1600 may employ similar mechanisms as in the methods 700, 800, 900, 1000, 1200, 1310, and/or 1500 described above with respect to FIGS. 7, 8, 9, 10, 11, 12, 13, and/or 15, respectively. As illustrated, the method 1600 includes a number of enumerated steps, but embodiments of the method 1600 include additional steps before, after, and in between the enumerated steps. In some embodiments, one or more of the enumerated steps may be omitted or performed in a different order.

At step 1610, the method 1600 includes receiving, by a core network entity from a BS (e.g., the BSs 105, 205, and/or 500) operating over a first cell frequency (e.g., the frequency carrier 220) of the network (e.g., the networks 100 and/or 200), a request to provide a network slice (e.g., the network slice 252) of a network (e.g., the networks 100 and/or 200) to a UE (e.g., the UEs 115, 215, 400, and/or 1302), the network slice not provided by the first cell frequency.

At step 1620, the method 1600 includes transmitting, by the core network entity to the BS, information associated with a second cell frequency (e.g., the frequency carrier 222) of the network providing the network slice.

Figure 17:
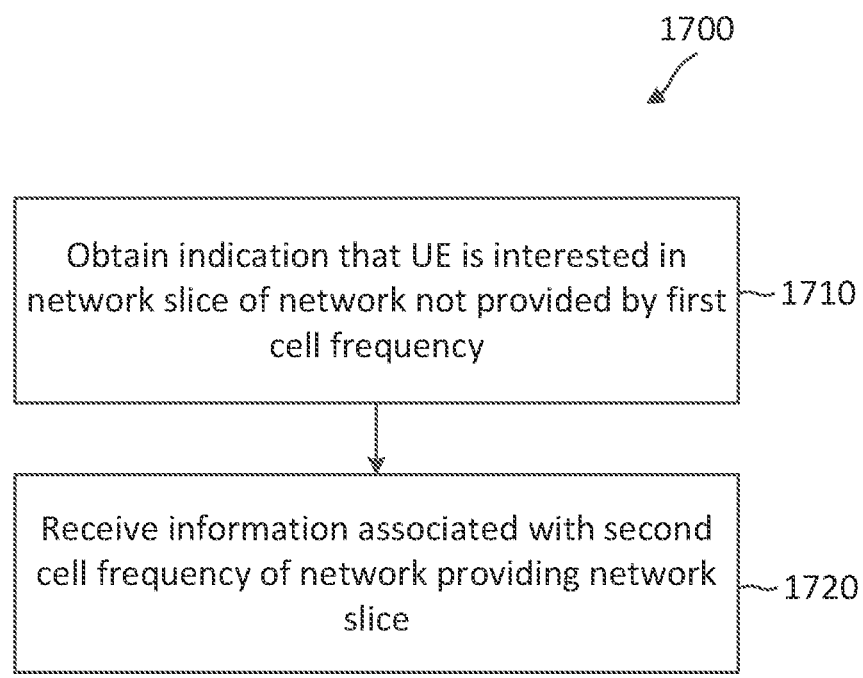
FIG. 17 is a flow diagram of a communication method according to some embodiments of the present disclosure.

FIG. 17 is a flow diagram of a communication method 1700 according to some embodiments of the present disclosure. Steps of the method 1700 can be executed by a computing device (e.g., a processor, processing circuit, and/or other suitable component) of a wireless communication device or other suitable means for performing the steps. For example, a network entity, such as the BS 105, 205, 500, and/or 1304, may utilize one or more components, such as the processor 502, the memory 504, the network slicing module 508, the transceiver 510, the modem 512, and the one or more antennas 516, to execute the steps of method 1700. The method 1700 may employ similar mechanisms as in the methods 700, 800, 900, 1000, 1200, 1310, and/or 1500 described above with respect to FIGS. 7, 8, 9, 10, 11, 12, 13, and/or 15, respectively. As illustrated, the method 1700 includes a number of enumerated steps, but embodiments of the method 1700 include additional steps before, after, and in between the enumerated steps. In some embodiments, one or more of the enumerated steps may be omitted or performed in a different order.

At step 1710, the method 1700 includes obtaining, by the BS, an indication that a UE (e.g., the UEs 115, 215, 400, and/or 1302) is interested in a network slice (e.g., the network slice 252) of a network (e.g., the networks 100 and/or 200) not provided by a first cell frequency (e.g., the frequency carrier 220), the BS in communication with the UE in the first cell frequency.

At step 1720, the method 1700 includes receiving, by the BS from a core network entity, information associated with a second cell frequency (e.g., the frequency carrier 222) of the network providing the network slice.

Figure 18:
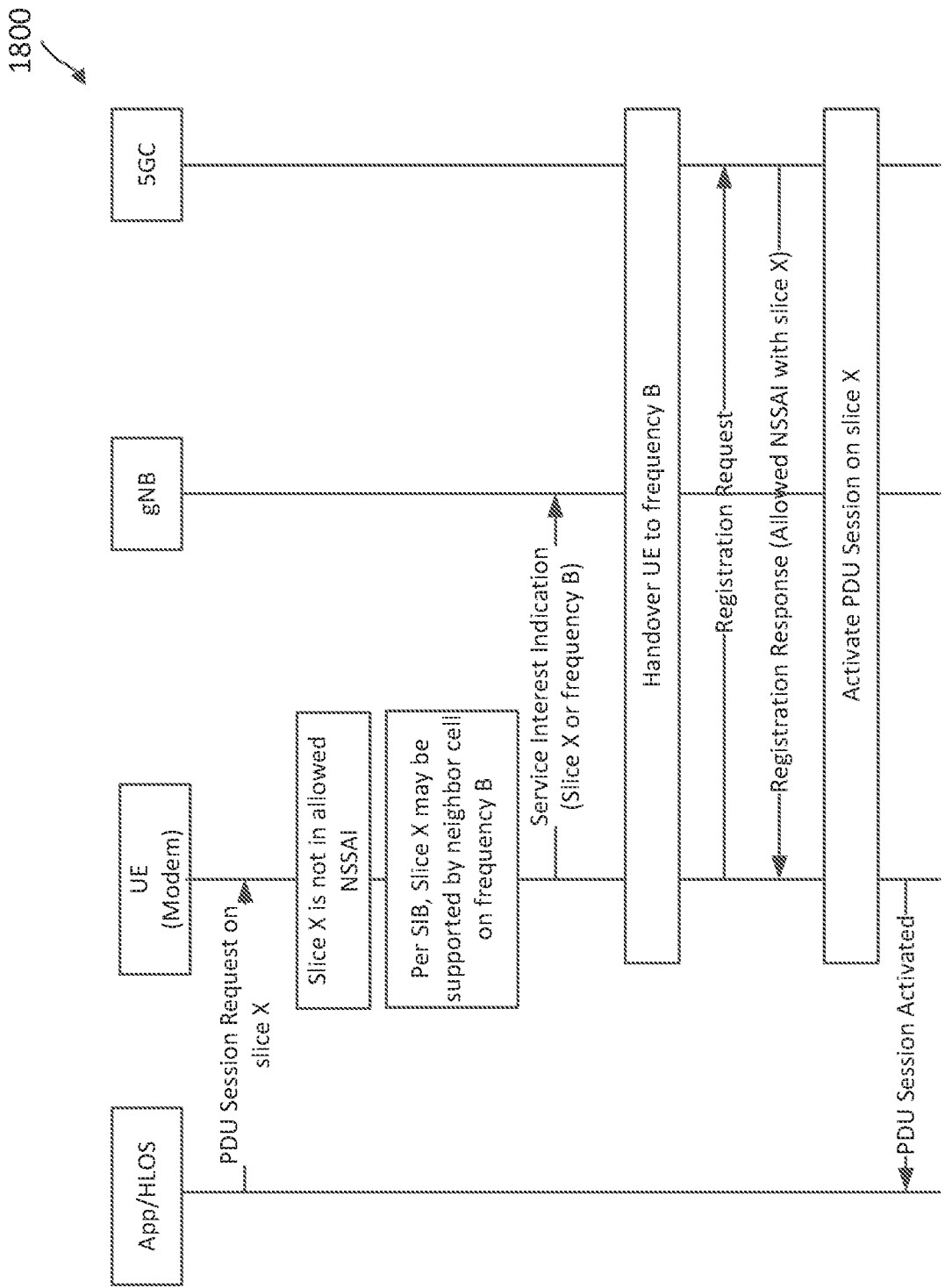
FIG. 18 illustrates an example call flow diagram of a network that supports mobility that considers network slicing factors, in accordance with certain aspects of the present disclosure.

FIG. 18 illustrates an example call flow diagram of a network that supports mobility that considers network slicing factors, in accordance with certain aspects of the present disclosure. For instance, the network may be similar to the network 100 of FIG. 1 and/or network 200 of FIG. 2. As illustrated in FIG. 18, in some cases, a UE may indicate interested slices by a new RRC message. For example, the new RRC message may be referred to as a new RRC message Service Interest Indication with various optional parameters. The optional parameters may include one or more of an interested frequency list, a single NSSAI (S-NSSAI) list, a Temporary Mobile Group Identity (TMGI) list, and relative priority between services. The UE may be similar to the UEs 115, 215, 400, and/or 1302 discussed above in relation to FIGS. 1, 2, 4, and/or 13, respectively.

In some cases, to allow a UE to identify what cells support what services, Service-Frequency mapping info may be provided to the UE. Such information may be provided via a SIB. As an alternative, such information could be provided by user plane (e.g., a download from a URL, similar to a User Service Description download in MBMS). In such cases, a version tag may be broadcasted in SIB for UE to check the freshness of its cached or fetched information. As described above, the RAN (e.g., the RAN 240) may also get "subscribed NSSAI" info from AMF to verify which of the UE requested slices are valid.

According to another option, the 5GC (e.g., the core network 230) may indicate UE interested slices to RAN (based on information provided by the UE). For example, the UE may provide "Requested NSSAI" to AMF in NAS Registration Request. The UE interested NSSAI should be included in the NAS "Requested NSSAI." The 5GC may then send the Interested NSSAI to RAN. The "S-NSSAIs" not in "Subscribed NSSAI" may be excluded from Interested NSSAI. In some cases (e.g., due to security/privacy concerns), the "Requested NSSAI" in Msg5 may not include full set of UE interested slices.

According to another option, the UE may send a PDU Session Request for a slice outside of "Allowed NSSAI" as an implicit indication of an interested slice. For example, when a request for slice X (which is outside of "Allowed NSSAI") is received, the UE may send out a PDU Session Request for slice X, if the UE believes it is still in the coverage of slice X.

The UE may know/believe it is slice X coverage, for example, based on measurement (e.g., UE is in gNB coverage), stored information (e.g., gNB supports slice X), SIB, or other information as described above. The gNB may be similar to the BSs 105, 205, 500, and/or 1304 discussed above in relation to FIGS. 1, 2, 5, and/or 13, respectively.

When PDU Session Request for slice X is received, the 5GC may send tentative PDU Session Establishment Request to the RAN. The RAN may then handover the UE to cell supporting slice X if possible.

As described herein, aspects of the present disclosure provide enhancements for Slice-aware mobility based on UE Interested Slices which may help avoid a UE being handed over to a cell that does not support a slice of interest when it was, in fact, in coverage area of that slice.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method includes transmitting, by a user equipment (UE) in a first cell frequency of a network, a request for a network slice of the network that is not provided by the first cell frequency; and receiving, by the UE in response to the request, information for communicating in a second cell frequency of the network that provides the network slice requested.

In some aspects, the method may also include one or more of the following features. For instance, the method includes where the transmitting includes transmitting, by the UE, a non-access stratum (NAS) registration request message including network slice selection assistance information (NSSAI), the NSSAI indicating that the network slice requested is preferred over another network slice of the network. The transmitting includes transmitting, by the UE, a non-access stratum (NAS) service request message indicating the network slice that is not included in allowed network slice selection assistance information (NSSAI). The transmitting includes transmitting, by the UE, a protocol data unit (PDU) session request message indicating the network slice that is not included in allowed network slice selection assistance information (NSSAI). The transmitting includes transmitting, by the UE, a radio resource control (RRC) message indicating the network slice. The transmitting includes transmitting, by the UE, a system information request message requesting frequency information associated with the network slice; and the receiving includes receiving, by the UE, a system information response message including the frequency information indicating that the network slice is provided by the second cell frequency. The method may include reselecting, by the UE, to the second cell frequency based on the frequency information received. The receiving includes receiving, by the UE, an instruction to perform at least one of a handover or a redirection to the second cell frequency. The receiving includes receiving, by the UE, a configuration for at least one of a dual-connectivity with the second cell frequency or a carrier aggregation with the second cell frequency. The method may include transmitting, by the UE in response to a determination that the configuration changes an availability of the network slice, a first non-access stratum (NAS) registration request message to obtain a first update of allowed network slice selection assistance information (NSSAI). The method may include receiving, by the UE, a de-configuration for the at least one the dual-connectivity with the second cell frequency or the carrier aggregation with the second cell frequency; transmitting, by the UE in response to a determination that the de-configuration changes the availability of the network slice, a second NAS registration request message to obtain a second update of the allowed NSSAI.

Further embodiments of the present disclosure include a method of wireless communication. The method includes receiving, by a core network entity from a base station (BS)

operating over a first cell frequency of a network, a request to provide a network slice of the network to a user equipment (UE), the network slice not provided by the first cell frequency; and transmitting, by the core network entity to the BS, information associated with a second cell frequency of the network providing the network slice.

In some aspects, the method may also include one or more of the following features. For instance, the method includes where the receiving includes receiving, by the core network entity, a non-access stratum (NAS) registration request message including network slice selection assistance information (NSSAI), the NSSAI indicating that the UE prefers the network slice requested over another network slice of the network. The method may include transmitting, by the core network entity to the BS, a message indicating that the UE prefers the network slice requested over the another network slice. The receiving includes receiving, by the core network entity, a non-access stratum (NAS) service request message indicating the network slice that is not included in allowed network slice selection assistance information (NSSAI). The receiving includes receiving, by the core network entity, a protocol data unit (PDU) session request message indicating the network slice that is not included in allowed network slice selection assistance information (NSSAI). The transmitting includes transmitting, by the core network entity to the BS, an instruction to direct the UE to communicate in the second cell frequency.

Further embodiments of the present disclosure include a method of wireless communication. The method includes obtaining, by a base station (BS), an indication that a user equipment (UE) is interested in a network slice of a network not provided by a first cell frequency, the BS in communication with the UE in the first cell frequency; and receiving, by the BS from a core network entity, information associated with a second cell frequency of the network providing the network slice.

In some aspects, the method may also include one or more of the following features. For instance, the method includes where the obtaining includes receiving, by the BS from the core network entity, a message indicating that the UE prefers the network slice requested over another network slice of the network. The obtaining includes receiving, by the BS from the UE, a radio resource control (RRC) message including the indication. The method may include selecting, by the BS, a target cell for a handover of the UE based at least in part on the indication. The method may include receiving, by the BS from the UE, a system information request message requesting frequency information associated with the network slice; and transmitting, by the BS, a system information response message indicating that the network slice is provided by the second cell frequency. The method may include receiving, by the BS from the core network entity, an instruction to direct the UE to the second cell frequency. The method may include transmitting, by the BS to the UE, an instruction to perform a handover to the second cell frequency based on the information associated with the second cell frequency. The method may include transmitting, by the BS to the UE, a configuration for at least one of a dual-connectivity with the second cell frequency or a carrier aggregation with the second cell frequency.

Further embodiments of the present disclosure include a user equipment (UE) including a transceiver configured to transmit, in a first cell frequency of a network, a request for a network slice of the network that is not provided by the first cell frequency; and receive, in response to the request, an information for communicating in a second cell frequency of the network that provides the network slice requested.

In some aspects, the UE may also include one or more of the following features. For instance, the UE includes where the transceiver configured to transmit the request is further configured to transmit a non-access stratum (NAS) registration request message including network slice selection assistance information (NSSAI), the NSSAI indicating that the network slice requested is preferred over another network slice of the network. The method may include transmitting, by the BS to the UE, a de-configuration for the at least one of the dual-connectivity with the second cell frequency or a carrier aggregation with the second cell frequency; transmitting, by the BS to the core network entity in response to a determination that the de-configuration changes the availability of the network slice, an indication of a change of the availability of the network slice. The transceiver configured to transmit the request is further configured to transmit a non-access stratum (NAS) service request message indicating the network slice that is not included in allowed network slice selection assistance information (NSSAI). The transceiver configured to transmit the request is further configured to transmit a protocol data unit (PDU) session request message indicating the network slice that is not included in allowed network slice selection assistance information (NSSAI). The transceiver configured to transmit the request is further configured to transmit a radio resource control (RRC) message indicating the network slice. The transceiver configured to transmit the request is further configured to transmit a system information request message requesting frequency information associated with the network slice; and the transceiver configured to receive the information is further configured to receive system information response message including the frequency information indicating that the network slice is provided by the second cell frequency. The UE may include a processor configured to reselect to the second cell frequency based on the frequency information received. The transceiver configured to receive the information is further configured to receive an instruction to perform a handover to the second cell frequency. The transceiver configured to receive the information is further configured to receive a configuration for at least one of a dual-connectivity with the second cell frequency or a carrier aggregation with the second cell frequency. The transceiver is further configured to transmit, in response to a determination that the configuration changes an availability of the network slice, a non-access stratum (NAS) registration request message to obtain updated allowed network slice selection assistance information (NSSAI) in response to the determination. The transceiver is further configured to receive a de-configuration for the at least one the dual-connectivity with the second cell frequency or the carrier aggregation with the second cell frequency; and transmit, in response to a determination that the de-configuration changes the availability of the network slice, a second NAS registration request message to obtain a second update of the allowed NSSAI.

Further embodiments of the present disclosure include a core network entity including a transceiver configured to receive, from a base station (BS) operating over a first cell frequency of a network, a request to provide a network slice of the network to a user equipment (UE), the network slice not provided by the first cell frequency; and transmit, to the BS, information associated with a second cell frequency of the network providing the network slice.

In some aspects, the core network entity may also include one or more of the following features. For instance, the core network entity includes where the transceiver configured to receive the request is further configured to receive a non-access stratum (NAS) registration request message including network slice selection assistance information (NSSAI), the NSSAI indicating that the UE prefers the network slice requested over another network slice of the network. The transceiver is further configured to transmit, to the BS, a message indicating that the UE prefers the network slice requested over the another network slice. The transceiver configured to receive the request is further configured to receive a non-access stratum (NAS) service request message indicating the network slice that is not included in allowed network slice selection assistance information (NSSAI). The transceiver configured to receive the request is further configured to receive a protocol data unit (PDU) session request message indicating the network slice that is not included in allowed network slice selection assistance information (NSSAI). The transceiver configured to transmit the information is further configured to transmit, to the BS, an instruction to direct the UE to communicate in the second cell frequency.

Further embodiments of the present disclosure include a base station (BS) including a processor configured to obtaining an indication that a user equipment (UE) is interested in a network slice of a network not provided by a first cell frequency, the BS in communication with the UE in the first cell frequency; and a transceiver configured to receiving, by the BS from a core network entity, information associated with a second cell frequency of the network providing the network slice.

In some aspects, the BS may also include one or more of the following features. For instance, the BS includes where the processor configured to obtain the indication is further configured to receive, from the core network entity via the transceiver, a message indicating that the UE prefers the network slice requested over another network slice of the network. The processor configured to obtain the indication is further configured to receive, from the UE via the transceiver, a radio resource control (RRC) message including the indication. The processor is further configured to select a target cell for a handover of the UE based at least in part on the indication. The transceiver is further configured to receive, from the UE, a system information request message requesting frequency information associated with the network slice; and transmit a system information response message indicating that the network slice is provided by the second cell frequency. The transceiver is further configured to receive, from the core network entity, an instruction to direct the UE to the second cell frequency. The transceiver is further configured to transmit, to the UE, an instruction to perform a handover to the second cell frequency based on the information associated with the second cell frequency. The transceiver is further configured to transmit, to the UE, a configuration for at least one of a dual-connectivity with the second cell frequency or a carrier aggregation with the second cell frequency. The transceiver is further configured to transmit, to the core network entity in response to a determination that the configuration changes an availability of the network slice, an indication of a change of the availability of the network slice requested in response to the determination. The transceiver is further configured to transmit, to the UE, a de-configuration for the at least one of the dual-connectivity with the second cell frequency or a carrier aggregation with the second cell frequency; transmit, to the core network entity in response to a determination that the de-configuration changes the availability of the network slice, an indication of a change of the availability of the network slice.

Further embodiments of the present disclosure include a computer-readable medium having program code recorded thereon. The computer-readable medium includes code for causing user equipment (UE) to transmit, in a first cell frequency of a network, a request for a network slice of the network that is not provided by the first cell frequency. The computer-readable medium also includes code for causing the UE to receive, in response to the request, an information for communicating in a second cell frequency of the network that provides the network slice requested.

In some aspects, the computer-readable medium may also include one or more of the following features. For instance, the computer-readable medium includes where the code for causing the UE to transmit the request is further configured to transmit a non-access stratum (NAS) registration request message including network slice selection assistance information (NSSAI), the NSSAI indicating that the network slice requested is preferred over another network slice of the network. The code for causing the UE to transmit the request is further configured to transmit a non-access stratum (NAS) service request message indicating the network slice that is not included in allowed network slice selection assistance information (NSSAI). The code for causing the UE to transmit the request is further configured to transmit a protocol data unit (PDU) session request message indicating the network slice that is not included in allowed network slice selection assistance information (NSSAI). The code for causing the UE to transmit the request is further configured to transmit a radio resource control (RRC) message indicating the network slice. The code for causing the UE to transmit the request is further configured to transmit a system information request message requesting frequency information associated with the network slice; and the code for causing the UE to receive the information is further configured to receive system information response message including the frequency information indicating that the network slice is provided by the second cell frequency. The computer-readable medium may include code for causing the UE to reselect to the second cell frequency based on the frequency information received. The code for causing the UE to receive the information is further configured to receive an instruction to perform a handover to the second cell frequency. The code for causing the UE to receive the information is further configured to receive a configuration for at least one of a dual-connectivity with the second cell frequency or a carrier aggregation with the second cell frequency. The computer-readable medium may include code for causing the UE to transmit, in response to a determination that the configuration changes an availability of the network slice, a non-access stratum (NAS) registration request message to obtain updated allowed network slice selection assistance information (NSSAI) in response to the determination. The computer-readable medium may include code for causing the UE to receive a de-configuration for the at least one the dual-connectivity with the second cell frequency or the carrier aggregation with the second cell frequency; and code for causing the UE to transmit, in response to a determination that the de-configuration changes the availability of the network slice, a second non-access stratum (NAS) registration request message to obtain a second update of the allowed NSSAI.

Further embodiments of the present disclosure include a computer-readable medium having program code recorded thereon. The computer-readable medium includes code for causing a core network entity to receive, from a base station (BS) operating over a first cell frequency of a network, a request to provide a network slice of the network to a user equipment (UE), the network slice not provided by the first cell frequency. The computer-readable medium also includes code for causing the core network entity to transmit, to the BS, information associated with a second cell frequency of the network providing the network slice.

The computer-readable medium may also include one or more of the following features. In some aspects, the computer-readable medium includes where the code for causing the core network entity to receive the request is further configured to receive a non-access stratum (NAS) registration request message including network slice selection assistance information (NSSAI), the NSSAI indicating that the UE prefers the network slice requested over another network slice of the network. The computer-readable medium may include code for causing the core network entity to transmit, to the BS, a message indicating that the UE prefers the network slice requested over the another network slice. The code for causing the core network entity to receive the request is further configured to receive a non-access stratum (NAS) service request message indicating the network slice that is not included in allowed network slice selection assistance information (NSSAI). The code for causing the core network entity to receive the request is further configured to receive a protocol data unit (PDU) session request message indicating the network slice that is not included in allowed network slice selection assistance information (NSSAI). The code for causing the core network entity to transmit the information is further configured to transmit, to the BS, an instruction to direct the UE to communicate in the second cell frequency.

Further embodiments of the present disclosure include a computer-readable medium having program code recorded thereon. The computer-readable medium includes code for causing a base station (BS) to obtain an indication that a user equipment (UE) is interested in a network slice of a network not provided by a first cell frequency, the BS in communication with the UE in the first cell frequency; and code for causing the BS to receive, from a core network entity, information associated with a second cell frequency of the network providing the network slice.

In some aspects, the computer-readable medium may also include one or more of the following features. For instance, the computer-readable medium includes where the code for causing the BS to obtain the indication is further configured to receive, from the core network entity, a message indicating that the UE prefers the network slice requested over another network slice of the network. The code for causing the BS to obtain the indication is further configured to receive, from the UE, a radio resource control (RRC) message including the indication. The computer-readable medium may include code for causing the BS to select a target cell for a handover of the UE based at least in part on the indication. The computer-readable medium may include code for causing the BS to receive, from the UE, a system information request message requesting frequency information associated with the network slice; and code for causing the BS to transmit a system information response message indicating that the network slice is provided by the second cell frequency. The computer-readable medium may include code for causing the BS to receive, from the core network entity, an instruction to direct the UE to the second cell frequency. The computer-readable medium may include code for causing the BS to transmit, to the UE, an instruction to perform a handover to the second cell frequency based on the information associated with the second cell frequency. The computer-readable medium may include code for causing the BS to transmit, to the UE, a configuration for at least one of a dual-connectivity with the second cell frequency or a carrier aggregation with the second cell frequency. The computer-readable medium may include code for causing the BS to transmit, to the core network entity in response to a determination that the configuration changes an availability of the network slice, an indication of a change of the availability of the network slice requested in response to the determination. The computer-readable medium may include code for causing the BS to transmit, to the UE, a de-configuration for the at least one of the dual-connectivity with the second cell frequency or a carrier aggregation with the second cell frequency; code for causing the BS to transmit, to the core network entity in response to a determination that the de-configuration changes the availability of the network slice, an indication of a change of the availability of the network slice.

Further embodiments of the present disclosure include a user equipment (UE) including means for transmitting, in a first cell frequency of a network, a request for a network slice of the network that is not provided by the first cell frequency. The user equipment also includes means for receiving, in response to the request, an information for communicating in a second cell frequency of the network that provides the network slice requested.

In some aspects, the UE may also include one or more of the following features. For instance, the UE includes where the means for transmitting the request is further configured to transmit a non-access stratum (NAS) registration request message including network slice selection assistance information (NSSAI), the NSSAI indicating that the network slice requested is preferred over another network slice of the network. The means for transmitting the request is further configured to transmit a non-access stratum (NAS) service request message indicating the network slice that is not included in allowed network slice selection assistance information (NSSAI). The means for transmitting the request is further configured to transmit a protocol data unit (PDU) session request message indicating the network slice that is not included in allowed network slice selection assistance information (NSSAI). The means for transmitting the request is further configured to transmit a radio resource control (RRC) message indicating the network slice. The means for transmitting the request is further configured to transmit a system information request message requesting frequency information associated with the network slice; and the means for receiving the information is further configured to receive system information response message including the frequency information indicating that the network slice is provided by the second cell frequency. The UE may include means for reselecting to the second cell frequency based on the frequency information received. The means for receiving the information is further configured to receiving an instruction to perform a handover to the second cell frequency. The means for receiving the information is further configured to receiving a configuration for at least one of a dual-connectivity with the second cell frequency or a carrier aggregation with the second cell frequency. The UE may include means for transmitting a non-access stratum (NAS) registration request message to obtain updated allowed network slice selection assistance information (NSSAI) in response to a determination that the configuration changes an availability of the network slice. The UE may include means for receiving a de-configuration for the at least one the dual-connectivity with the second cell frequency or the carrier aggregation with the second cell frequency; and means for transmitting, in response to a determination that the de-configuration changes the availability of the network slice, a second non-access stratum (NAS) registration request message to obtain a second update of the allowed NSSAI.

Further embodiments of the present disclosure include a core network entity including means for receiving, from a base station (BS) operating over a first cell frequency of a network, a request to provide a network slice of the network to a user equipment (UE), the network slice not provided by the first cell frequency. The core network entity also includes means for transmitting, to the BS, information associated with a second cell frequency of the network providing the network slice.

In some aspects, the core network entity may also include one or more of the following features. For instance, the core network entity includes where the means for receiving the request is further configured to receive a non-access stratum (NAS) registration request message including network slice selection assistance information (NSSAI), the NSSAI indicating that the UE prefers the network slice requested over another network slice of the network. The core network entity may include means for transmitting, to the BS, a message indicating that the UE prefers the network slice requested over the another network slice. The means for receiving the request is further configured to receiving a non-access stratum (NAS) service request message indicating the network slice that is not included in allowed network slice selection assistance information (NSSAI). The means for receiving the request is further configured to receiving a protocol data unit (PDU) session request message indicating the network slice that is not included in allowed network slice selection assistance information (NSSAI). The means for transmitting the information is further configured to transmitting, to the BS, an instruction to direct the UE to communicate in the second cell frequency.

Further embodiments of the present disclosure include a base station (BS) including means for obtaining an indication that a user equipment (UE) is interested in a network slice of a network not provided by a first cell frequency, the BS in communication with the UE in the first cell frequency; and means for receiving, from a core network entity, information associated with a second cell frequency of the network providing the network slice.

In some aspects, the BS may also include one or more of the following features. For instance, the BS includes where the means for obtaining the indication is further configured to receive, from the core network entity, a message indicating that the UE prefers the network slice requested over another network slice of the network. The means for obtaining the indication is further configured to receive, from the UE, a radio resource control (RRC) message including the indication. The BS may include means for selecting a target cell for a handover of the UE based at least in part on the indication. The BS may include means for receiving, from the UE, a system information request message requesting frequency information associated with the network slice; and means for transmitting a system information response message indicating that the network slice is provided by the second cell frequency. The BS may include means for receiving, from the core network entity, an instruction to direct the UE to the second cell frequency. The BS may include means for transmitting, to the UE, an instruction to perform a handover to the second cell frequency based on the information associated with the second cell frequency. The BS may include means for transmitting, to the UE, a configuration for at least one of a dual-connectivity with the second cell frequency or a carrier aggregation with the second cell frequency. The BS may include means for transmitting, to the core network in response to a determination that the configuration changes an availability of the network slice, an indication of a change of the availability of the network slice requested. The BS may include means for transmitting, to the UE, a de-configuration for the at least one of the dual-connectivity with the second cell frequency or a carrier aggregation with the second cell frequency; means for transmitting, to the core network entity in response to a determination that the de-configuration changes the availability of the network slice, an indication of a change of the availability of the network slice.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a network entity, comprising:
    obtaining an indication that a user equipment (UE) is interested in a network slice of a network not provided by a first cell frequency, the network entity in communication with the UE in the first cell frequency; and
    receiving, from a core network entity, information associated with a second cell frequency of the network providing the network slice.

2. The method of claim 1, wherein the obtaining includes:
    receiving, from the core network entity, a message indicating that the UE prefers the network slice requested over another network slice of the network.

3. The method of claim 1, wherein the obtaining includes:
    receiving, from the UE, a radio resource control (RRC) message including the indication.

4. The method of claim 3, further comprising:
    selecting a target cell for a handover of the UE based at least in part on the indication.

5. The method of claim 1, further comprising:
    receiving, from the UE, a system information request message requesting frequency information associated with the network slice; and
    transmitting a system information response message indicating that the network slice is provided by the second cell frequency.

6. The method of claim 1, further comprising:
    receiving, from the core network entity, an instruction to direct the UE to the second cell frequency.

7. The method of claim 1, further comprising:
    transmitting, to the UE, an instruction to perform a handover to the second cell frequency based on the information associated with the second cell frequency.

8. The method of claim 1, further comprising:
    transmitting, to the UE, a configuration for at least one of a dual-connectivity with the second cell frequency or a carrier aggregation with the second cell frequency.

9. A network entity, comprising:
    a memory;
    a transceiver; and a processor in communication with the memory and the transceiver, wherein the network entity is configured to:
- obtain an indication that a user equipment (UE) is interested in a network slice of a network not provided by a first cell frequency, the network entity in communication with the UE in the first cell frequency; and
- receive, from a core network entity, information associated with a second cell frequency of the network providing the network slice.

10. The network entity of claim 9, wherein the network entity is configured to:
- receive, from the core network entity via the transceiver, a first message indicating that the UE prefers the network slice requested over another network slice of the network;
- obtain the indication that the UE is interested in the network slice of the network not provided by the first cell frequency from the received message.

11. The network entity of claim 9, wherein the network entity is configured to:
- receive, from the UE via the transceiver, a radio resource control (RRC) message including the indication that the UE is interested in the network slice of the network not provided by the first cell frequency; and
- transmit, to the UE, an instruction to perform a handover to the second cell frequency based on at least one of the information associated with the second cell frequency and indication that the UE is interested in the network slice of the network not provided by the first cell frequency.

12. The network entity of claim 9, wherein the network entity is further configured to:
- receive, from the UE, a system information request message requesting frequency information associated with the network slice; and
- transmit a system information response message indicating that the network slice is provided by the second cell frequency.

13. The network entity of claim 9, wherein the network entity is further configured to:
- receive, from the core network entity, an instruction to direct the UE to the second cell frequency;
- transmit, to the UE, at least one of:
  - an instruction to perform a handover to the second cell frequency based on the information associated with the second cell frequency; or
  - a configuration for at least one of a dual-connectivity with the second cell frequency or a carrier aggregation with the second cell frequency.

14. A non-transitory, computer-readable medium having program code recorded thereon, wherein the program code comprises instructions executable by a processor of a network entity to cause the network entity to:
- obtain an indication that a user equipment (UE) is interested in a network slice of a network not provided by a first cell frequency, the network entity in communication with the UE in the first cell frequency; and
- receive, from a core network entity, information associated with a second cell frequency of the network providing the network slice.

15. The non-transitory, computer-readable medium of claim 14, wherein the instructions causing the network entity to obtain the indication comprises instructions causing the network entity to:
- receive, from the core network entity, a message indicating that the UE prefers the network slice requested over another network slice of the network.

16. The non-transitory, computer-readable medium of claim 14, wherein the instructions causing the network entity to obtain the indication comprises instructions causing the network entity to:
- receive, from the UE, a radio resource control (RRC) message including the indication.

17. The non-transitory, computer-readable medium of claim 16, wherein the program code further comprises instructions causing the network entity to:
- select a target cell for a handover of the UE based at least in part on the indication.

18. The non-transitory, computer-readable medium of claim 14, wherein the program code further comprises instructions causing the network entity to:
- receive, from the UE, a system information request message requesting frequency information associated with the network slice; and
- transmit a system information response message indicating that the network slice is provided by the second cell frequency.

19. The non-transitory, computer-readable medium of claim 14, wherein the program code further comprises instructions causing the network entity to:
- receive, from the core network entity, an instruction to direct the UE to the second cell frequency.

20. The non-transitory, computer-readable medium of claim 14, wherein the program code further comprises instructions causing the network entity to:
- transmit, to the UE, an instruction to perform a handover to the second cell frequency based on the information associated with the second cell frequency.

21. The non-transitory, computer-readable medium of claim 14, wherein the program code further comprises instructions causing the network entity to:
- transmit, to the UE, a configuration for at least one of a dual-connectivity with the second cell frequency or a carrier aggregation with the second cell frequency.

22. A network entity, comprising:
- means for obtaining an indication that a user equipment (UE) is interested in a network slice of a network not provided by a first cell frequency, the network entity in communication with the UE in the first cell frequency; and
- means for receiving, from a core network entity, information associated with a second cell frequency of the network providing the network slice.

23. The network entity of claim 22, wherein the means for obtaining includes:
- means for receiving, from the core network entity, a message indicating that the UE prefers the network slice requested over another network slice of the network.

24. The network entity of claim 22, wherein the means for obtaining includes:
- means for receiving, from the UE, a radio resource control (RRC) message including the indication.

25. The network entity of claim 24, further comprising:
- means for selecting a target cell for a handover of the UE based at least in part on the indication.

26. The network entity of claim 22, further comprising:
- means for receiving, from the UE, a system information request message requesting frequency information associated with the network slice; and means for transmitting a system information response message indicating that the network slice is provided by the second cell frequency.

27. The network entity of claim 22, further comprising:
means for receiving, from the core network entity, an instruction to direct the UE to the second cell frequency.

28. The network entity of claim 22, further comprising:
means for transmitting, to the UE, an instruction to perform a handover to the second cell frequency based on the information associated with the second cell frequency.

29. The network entity of claim 22, further comprising:
means for transmitting, to the UE, a configuration for at least one of a dual-connectivity with the second cell frequency or a carrier aggregation with the second cell frequency.

\* \* \* \* \*